US012254849B2

(12) United States Patent
Miao et al.

(10) Patent No.: US 12,254,849 B2
(45) Date of Patent: Mar. 18, 2025

(54) DISPLAY PANEL HAVING DIFFERENT VOLTAGE CONVERSION EDGE FOR POSITIVE AND NEGATIVE DATA VOLTAGES AND DRIVING METHOD THEREOF

(71) Applicants: Beijing BOE Display Technology Co., Ltd., Beijing (CN); BOE Technology Group Co., Ltd., Beijing (CN)

(72) Inventors: Yingmeng Miao, Beijing (CN); Yanping Liao, Beijing (CN); Dongchuan Chen, Beijing (CN); Shulin Yao, Beijing (CN); Jiantao Liu, Beijing (CN)

(73) Assignees: Beijing BOE Display Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/024,480

(22) PCT Filed: Mar. 8, 2022

(86) PCT No.: PCT/CN2022/079671

§ 371 (c)(1),
(2) Date: Mar. 2, 2023

(87) PCT Pub. No.: WO2023/168586

PCT Pub. Date: Sep. 14, 2023

(65) Prior Publication Data

US 2024/0290294 A1 Aug. 29, 2024

(51) Int. Cl.
*G09G 3/36* (2006.01)

(52) U.S. Cl.
CPC ... *G09G 3/3688* (2013.01); *G09G 2300/0828* (2013.01); *G09G 2310/08* (2013.01); *G09G 2330/021* (2013.01)

(58) Field of Classification Search
CPC .................... G09G 3/3688
USPC .................... 345/87
See application file for complete search history.

(56) References Cited

U.S. PATENT DOCUMENTS

2005/0104835 A1* 5/2005 Misonou .............. G09G 3/3614 345/96
2007/0152942 A1 7/2007 Yamagishi
2011/0135311 A1 6/2011 Enami et al.
2016/0070147 A1* 3/2016 Kim .................... G02F 1/1368 345/96
2017/0004799 A1 1/2017 Park et al.
2017/0076679 A1 3/2017 Ou et al.

FOREIGN PATENT DOCUMENTS

CN 1996105 A 7/2007
CN 101785159 A 7/2010
CN 106330168 A 1/2017
(Continued)

*Primary Examiner* — Long D Pham
(74) *Attorney, Agent, or Firm* — IPro, PLLC

(57) ABSTRACT

A driving method for a display panel and a display apparatus. The driving method includes: acquiring display data of a to-be-displayed image in a current display frame (S100); and loading a data voltage on a data line in the display panel according to the display data, such that each sub-pixel in the display panel is charged with the corresponding data voltage (S200).

18 Claims, 10 Drawing Sheets

(56) References Cited

FOREIGN PATENT DOCUMENTS

| | | | |
|---|---|---|---|
| CN | 110223624 | A | 9/2019 |
| CN | 111273495 | A | 6/2020 |
| CN | 111276109 | A | 6/2020 |
| CN | 111679527 | A | 9/2020 |
| CN | 111754917 | A | 10/2020 |
| CN | 112216249 | A | 1/2021 |
| CN | 109192168 | B | 8/2021 |
| CN | 113990237 | A | 1/2022 |
| JP | 2007183329 | A | 7/2007 |
| KR | 20170005291 | A | 1/2017 |

* cited by examiner

DISPLAY PANEL HAVING DIFFERENT VOLTAGE CONVERSION EDGE FOR POSITIVE AND NEGATIVE DATA VOLTAGES AND DRIVING METHOD THEREOF

The present application is a National Stage of International Application No. PCT/CN2022/079671, filed on Mar. 8, 2022, which is hereby incorporated by reference in its entirety.

FIELD

The present disclosure relates to the technical field of display, in particular to a driving method for a display panel and a display apparatus.

BACKGROUND

In displays such as a liquid crystal display (LCD) and an organic light-emitting diode (OLED) display, a plurality of pixel units are generally included. Each pixel unit may include: a red sub-pixel, a green sub-pixel and a blue sub-pixel. By controlling brightness corresponding to each sub-pixel, colors required to be displayed is obtained by mixing to display a color image.

SUMMARY

A driving method for a display panel provided by an embodiment of the present disclosure includes: acquiring display data of a to-be-displayed image in a current display frame; and loading a data voltage on a data line in the display panel according to the display data, such that each sub-pixel in the display panel is charged with the data voltage; wherein a first target duration is between an end time point of a voltage conversion edge when the data line is loaded with a positive data voltage and a start time point of a data charging stage corresponding to the sub-pixel charged with the positive data voltage, a second target duration is between an end time point of a voltage conversion edge when the data line is loaded with a negative data voltage and a start time point of a data charging stage corresponding to the sub-pixel charged with the negative data voltage, and the second target duration is larger than the first target duration.

In some examples, a voltage conversion rate of the voltage conversion edge when the data line is loaded with the positive data voltage is a first conversion rate; a voltage conversion rate of the voltage conversion edge when the data line is loaded with the negative data voltage is a second conversion rate; a start time point of the voltage conversion edge when the data line is loaded with the positive data voltage is later than the start time point of the data charging stage corresponding to the sub-pixel charged with the positive data voltage, and a first interval duration is between the start time point of the voltage conversion edge when the data line is loaded with the positive data voltage and the start time point of the data charging stage corresponding to the sub-pixel charged with the positive data voltage; and a start time point of the voltage conversion edge when the data line is loaded with the negative data voltage is later than the start time point of the data charging stage corresponding to the sub-pixel charged with the negative data voltage, and a second interval duration is between the start time point of the voltage conversion edge when the data line is loaded with the negative data voltage and the start time point of the data charging stage corresponding to the sub-pixel charged with the negative data voltage.

After the acquiring the display data of the to-be-displayed image in the current display frame, and before the loading the data voltage on the data line in the display panel according to the display data, the driving method further includes: determining the first conversion rate and the second conversion rate, and/or the first interval duration and the second interval duration.

The loading the data voltage on the data line in the display panel according to the display data, includes: loading the data voltage on the data line in the display panel by using the determined first conversion rate and second conversion rate, and/or the determined first interval duration and second interval duration according to the display data.

In some examples, the determined second conversion rate is less than the determined first conversion rate.

In some examples, the determining the first conversion rate and the second conversion rate, includes: selecting two set voltage conversion rates from a plurality of different set voltage conversion rates which are pre-stored, taking a larger one of the two selected set voltage conversion rates as the first conversion rate, and taking a smaller one of the two selected set voltage conversion rates as the second conversion rate.

In some examples, the determined second interval duration is larger than the determined first interval duration.

In some examples, the determining the first interval duration and the second interval duration, includes: selecting two set interval durations from a plurality of different set interval durations which are pre-stored, taking a larger one of the two selected set interval durations as the second interval duration, and taking a smaller one of the two selected set interval durations as the first interval duration.

In some examples, the determined second conversion rate is less than the determined first conversion rate, and the determined second interval duration is equal to the determined first interval duration.

In some examples, the determining the first conversion rate, the second conversion rate, the first interval duration and the second interval duration, includes: selecting two set voltage conversion rates from a plurality of different set voltage conversion rates which are pre-stored, taking a larger one of the two selected set voltage conversion rates as the first conversion rate, and taking a smaller one of the two selected set voltage conversion rates as the second conversion rate; and selecting one set interval duration from a plurality of different set interval durations which are pre-stored as the first interval duration and the second interval duration.

In some examples, the determined second conversion rate is equal to the determined first conversion rate, and the determined second interval duration is larger than the determined first interval duration.

In some examples, the determining the first conversion rate, the second conversion rate, the first interval duration and the second interval duration, includes: selecting one set voltage conversion rate from a plurality of different set voltage conversion rates which are pre-stored as the first conversion rate and the second conversion rate respectively; and selecting two set interval durations from a plurality of different set interval durations which are pre-stored, taking a larger one of the two selected set interval durations as the second interval duration, and taking a smaller one of the two selected set interval durations as the first interval duration.

In some examples, the data voltage is triggered by a set edge of a data trigger signal and is input to the data line; the set edge is one of a rising edge and a falling edge; and the start time point of the voltage conversion edge of the data voltage is aligned with the set edge.

A display apparatus provided by an embodiment of the present disclosure includes: a display panel, including a source driving circuit; and a timing controller, configured to acquire display data of a to-be-displayed image in a current display frame, and send the display data to the source driving circuit; wherein the source driving circuit is configured to load a data voltage on a data line in the display panel according to the display data, such that each sub-pixel in the display panel is charged with the corresponding data voltage; wherein a first target duration is between an end time point of a voltage conversion edge when the data line is loaded with a positive data voltage and a start time point of a data charging stage corresponding to the sub-pixel charged with the positive data voltage, a second target duration is between an end time point of a voltage conversion edge when the data line is loaded with a negative data voltage and a start time point of a data charging stage corresponding to the sub-pixel charged with the negative data voltage, and the second target duration is larger than the first target duration.

In some examples, the display panel includes a source driving circuit; the timing controller is further configured to determine a first conversion rate, a second conversion rate, a first interval duration and a second interval duration, and output a first rate control signal corresponding to the first conversion rate, a second rate control signal corresponding to the second conversion rate, a first duration control signal corresponding to the first interval duration and a second duration control signal corresponding to the second interval duration to the source driving circuit; and the source driving circuit is further configured to load the data voltage on the data line in the display panel according to the received first rate control signal, second rate control signal, first duration control signal, second duration control signal and the display data, such that each sub-pixel in the display panel is charged with the data voltage.

In some examples, the source driving circuit includes: a plurality of voltage output circuits, and one data line is electrically connected with one voltage output circuit; and each voltage output circuit is configured to load the data voltage on the data line electrically connected to the voltage output circuit according to the received first rate control signal, second rate control signal, first duration control signal and second duration control signal and based on the display data.

In some examples, each voltage output circuit includes a digital-to-analogue conversion circuit, a data output circuit, a first decoder and a second decoder; the digital-to-analogue conversion circuit is configured to receive the display data and output data obtained by performing digital-to-analogue conversion on the received display data to the data output circuit: the first decoder is configured to obtain a first rate conversion signal through decoding according to the first rate control signal: the second decoder is configured to obtain a second rate conversion signal through decoding according to the second rate control signal; and the data output circuit is configured to receive the first rate conversion signal, the first duration control signal, the second rate conversion signal and the second duration control signal, output the positive data voltage to the data line electrically connected to the data output circuit according to the first rate conversion signal and the first duration control signal and based on the display data output by the digital-to-analogue conversion circuit, and output the negative data voltage to the data line electrically connected to the data output circuit according to the second rate conversion signal and the second duration control signal and based on the display data output by the digital-to-analogue conversion circuit.

DETAILED DESCRIPTION OF THE EMBODIMENTS

Figure 1:
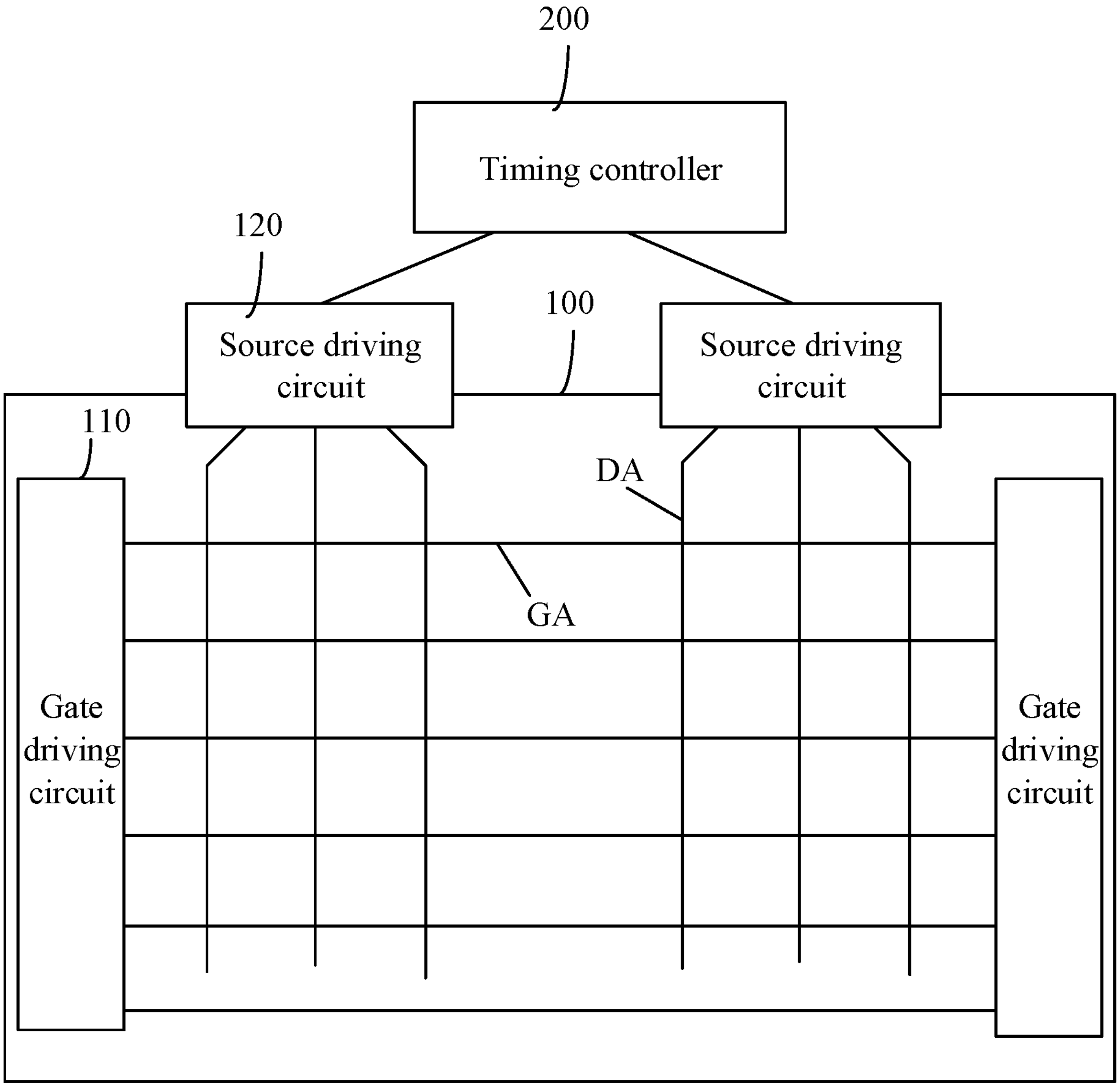
FIG. 1 is a schematic diagram of some structures of a display apparatus in an embodiment of the present disclosure.

To make objectives, technical solutions and advantages of embodiments of the present disclosure clearer, the technical solutions of the embodiments of the present disclosure will be clearly and completely described below in conjunction with accompanying drawings of the embodiments of the present disclosure. Apparently, the described embodiments are a part of the embodiments of the present disclosure, not all of the embodiments. In addition, the embodiments in the present disclosure and features in the embodiments can be combined with each other in the case of not conflicting. Based on the described embodiments of the present disclosure, all other embodiments obtained by those ordinarily skilled in the art without creative work shall fall within the protection scope of the present disclosure.

Unless otherwise defined, technical or scientific terms used in the present disclosure shall have the ordinary meanings understood by those ordinarily skilled in the art to which the present disclosure pertains. The words “first”, “second” and the similar words used in the present disclosure do not indicate any order, quantity or importance, but are merely used to distinguish different components. The words “comprise” or “include” and the like indicate that an element or item appearing before the word covers listed elements or items appearing after the word and equivalents thereof, and does not exclude other elements or items. The words “connect” or “couple” or the like are not limited to physical or mechanical connection, but may include electrical connection, whether direct or indirect.

It needs to be noted that sizes and shapes of all figures in the accompanying drawings do not reflect true scales, and are only intended to schematically illustrate the content of the present disclosure. The same or similar reference numerals represent the same or similar elements or elements with the same or similar functions all the time.

Figure 2:
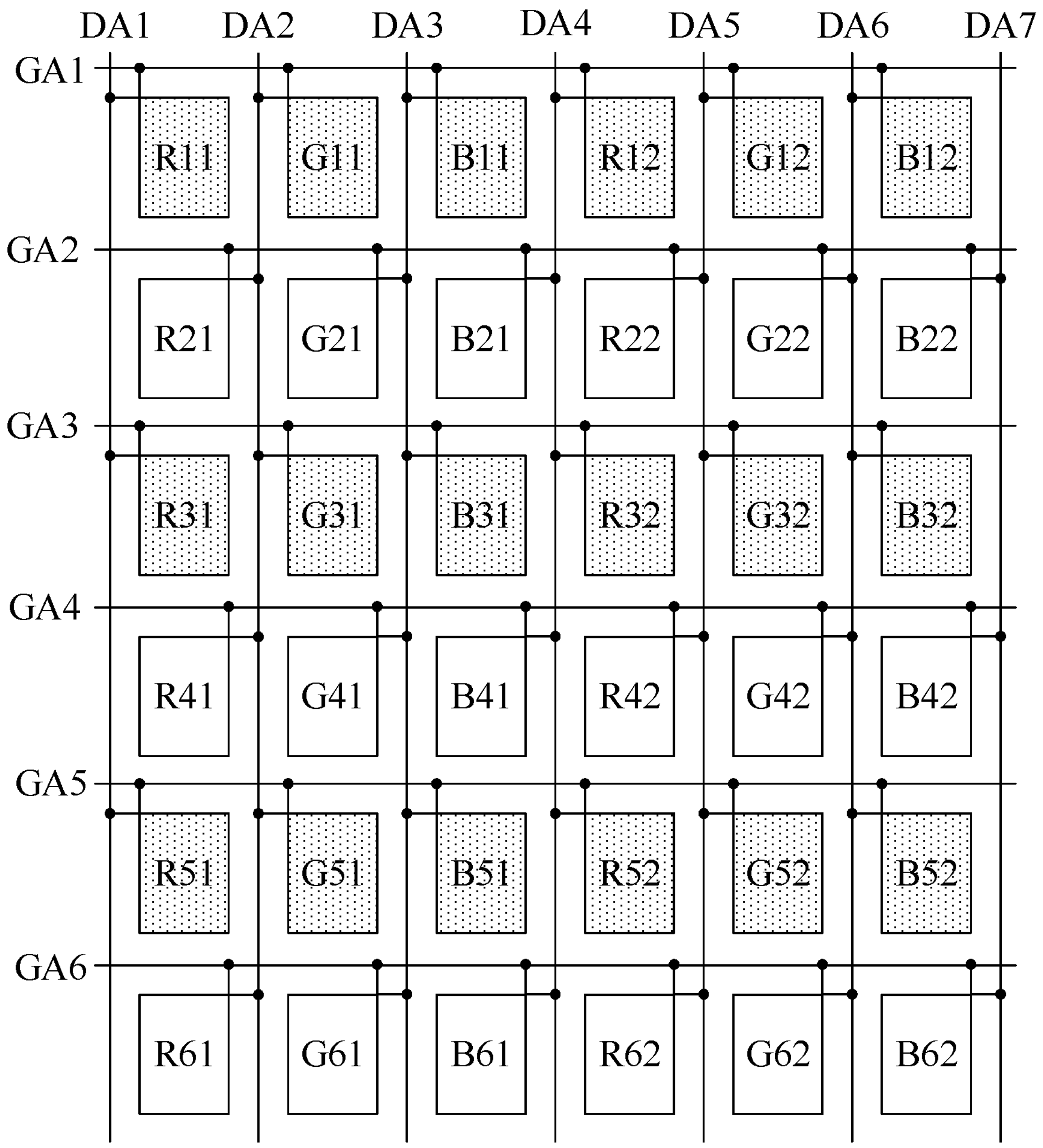
FIG. 2 a schematic diagram of some structures of a display panel in an embodiment of the present disclosure.

Referring to FIG. 1 and FIG. 2, a display apparatus may include a display panel 100 and a timing controller 200. The display panel 100 may include a plurality of pixel units arranged in an array, a plurality of gate lines GA (such as GA1, GA2, GA3, GA4, GA5 and GA6), a plurality of data lines DA (such as DA1, DA2, DA3, DA4, DA5, DA6 and DA7), a gate driving circuit 110 and a source driving circuit 120. The gate driving circuit 110 is respectively coupled with the gate lines GA (such as GA1, GA2, GA3, GA4, GA5 and GA6), and the source driving circuit 120 is respectively coupled with the data lines (such as DA1, DA2, DA3, DA4, DA5, DA6 and DA7). The timing controller 200 may input a control signal to the gate driving circuit 110, such that the gate driving circuit 110 inputs signals to the gate lines GA (such as GA1, GA2, GA3, GA4, GA5 and GA6), so as to drive the gate lines GA (such as GA1, GA2, GA3, GA4, GA5 and GA6). Exemplarily, the timing controller may acquire display data of a to-be-displayed image in a current display frame, in addition, the timing controller 200 sends the acquired display data to the source driving circuit 120, which may enable the source driving circuit 120 to load a data voltage to a data line in the display panel according to the display data, so as to charge sub-pixels, so that each sub-pixel is charged with the corresponding data voltage, and an image display function is realized.

Exemplarily, a plurality of source driving circuits 120 may be arranged, and different source driving circuits are connected with different data lines. For example, two source driving circuits 120 may be arranged, one of the source driving circuits 120 is connected with half of the quantity of the data lines, and the other one of the source driving circuits 120 is connected with the other half of the quantity of the data lines. Of course, three, four or more source driving circuits 120 may also be arranged, which may be designed and determined according to requirements of practical applications, which is not limited here.

Exemplarily, each pixel unit includes a plurality of sub-pixels. For example, the pixel units may include red sub-pixels, green sub-pixels and blue sub-pixels, so that red, green and blue may be mixed to realize color display. Or, the pixel units may also include red sub-pixels, green sub-pixels, blue sub-pixels and white sub-pixels, so that red, green, blue and white may be mixed to realize color display. Of course, in practical application, a light emitting color of the sub-pixels in the pixel units may be designed and determined according to practical application environments, which is not limited here.

Exemplarily, each sub-pixel may include a transistor and a pixel electrode. One row of sub-pixels is correspondingly coupled with one gate line. Taking one column of sub-pixels as an example, an odd-numbered row of sub-pixels in the column of sub-pixels are coupled with the data lines on left sides of the column of sub-pixels, and an even-numbered row of sub-pixels are coupled with the data lines on right sides of the column of sub-pixels. Alternatively, an odd-numbered row of sub-pixels in the column of sub-pixels are coupled with the data lines on the right sides of the column of sub-pixels, and an even-numbered row of sub-pixels are coupled with the data lines on the left sides of the column of sub-pixels. In addition, a gate of a transistor is electrically connected with a gate line corresponding to the transistor, a source of the transistor is electrically connected with a data line corresponding to the transistor, and a drain of the transistor is electrically connected with the pixel electrode. It should be noted that a pixel array structure in the present disclosure may further be a double-gate structure, that is, two gate lines are arranged between two adjacent rows of pixels, in this arrangement mode, the quantity of the data lines may be reduced by half, that is, the data lines between two adjacent columns of pixels are included, and the data lines are not included between some two adjacent columns of pixels, and a specific pixel arrangement structure and the arrangement mode of the data lines and scanning lines are not limited.

It should be noted that the display panel in the embodiment of the present disclosure may be a liquid crystal display panel, an OLED display panel and the like, which is not limited here.

Gray scales are generally that brightness change between the darkest and the brightest is divided into a plurality of parts to facilitate screen brightness control. For example, displayed images are composed of three colors of red, green and blue, each color may present different brightness levels, and red, green and blue of different brightness levels may be combined to form different colors. For example, the gray scales of the liquid crystal display panel are 6 bits, the three colors of red, green and blue have 64 (namely $2^6$) gray scales respectively, and the 64 gray scale values are respectively 0-63. The gray scales of the liquid crystal display panel are 8 bits, the three colors of red, green and blue have 256 (namely $2^8$) gray scales respectively, and the 256 gray scale values are respectively 0-255. The gray scales of the liquid crystal display panel are 10 bits, the three colors of red, green and blue have 1024 (namely $2^{10}$) gray scales respectively, and the 1024 gray scale values are respectively 0-1023. The gray scales of the liquid crystal display panel are 12 bits, the three colors of red, green and blue have 4096 (namely $2^{12}$) gray scales respectively, and the 4096 gray scale values are respectively 0-4093.

Taking a sub-pixel in the liquid crystal display panel as an example, when the data voltage input to the pixel electrode of the sub-pixel is larger than a common electrode voltage, a liquid crystal molecule at the sub-pixel may be positive, and a polarity corresponding to the data voltage in the sub-pixel is a positive polarity. When the data voltage input to the pixel electrode of the sub-pixel is less than the common electrode voltage, the liquid crystal molecule at the sub-pixel may be negative, and the polarity corresponding to the data voltage in the sub-pixel is a negative polarity. For example, the common electrode voltage may be 8.3 V, if the data voltages of 8.3 V-16 V are input to the pixel electrode of the sub-pixel, the liquid crystal molecule at the sub-pixel may be positive, and the data voltages of 8.3 V-16 V are data voltages corresponding to the positive polarity. If the data voltages of 0.6 V-8.3 V are input to the pixel electrode of the sub-pixel, the liquid crystal molecule at the sub-pixel may be negative, and the data voltages of 0.6 V-8.3 V are data voltages corresponding to the negative polarity. Exemplarily, taking the 8-bit gray scales of 0-255 as an example, if the data voltage of 16 V is input to the pixel electrode of the sub-pixel, the sub-pixel may correspond to the brightness of a positive maximum gray scale value. If the data voltage of 0.6 V is input to the pixel electrode of the sub-pixel, the sub-pixel may correspond to the brightness of a negative maximum gray scale value. In this way, the polarity corresponding to the sub-pixels may be controlled, such that the display panel realizes a frame flipping mode, a column flipping mode, a row flipping mode, a point flipping mode and the like.

When the image is displayed on the display panel, the problem of poor image display may be caused by the difference in charging rates of the sub-pixels. For example, when the display panel displays a reloading image (such as an image displayed when the gray scale values of the two adjacent rows differ greatly, for example, taking 8 bits as an example, the reloading image may be an image displayed when the gray scale values of the two adjacent rows differ by more than 127), serial may be generated, and when the display panel displays a black-and-white checkerboard image, the problems of a line residual image and the like may be generated.

Taking the display panel displaying a reloading image as an example, the situation that a pixel unit includes a red sub-pixel, a green sub-pixel and a blue sub-pixel is taken as an example for illustration below: As shown in FIG. 2, a red sub-pixel R11, a green sub-pixel G11 and a blue sub-pixel B11 are a pixel unit, and a red sub-pixel R12, a green sub-pixel G12 and a blue sub-pixel B12 are a pixel unit. A red sub-pixel R21, a green sub-pixel G21 and a blue sub-pixel B21 are a pixel unit, and a red sub-pixel R22, a green sub-pixel G22 and a blue sub-pixel B22 are a pixel unit. A red sub-pixel R31, a green sub-pixel G31 and a blue sub-pixel B31 are a pixel unit, and a red sub-pixel R32, a green sub-pixel G32 and a blue sub-pixel B32 are a pixel unit. A red sub-pixel R41, a green sub-pixel G41 and a blue sub-pixel B41 are a pixel unit, and a red sub-pixel R42, a green sub-pixel G42 and a blue sub-pixel B42 are a pixel unit. A red sub-pixel R51, a green sub-pixel G51 and a blue sub-pixel B51 are a pixel unit, and a red sub-pixel R52, a green sub-pixel G52 and a blue sub-pixel B52 are a pixel unit. A red sub-pixel R61, a green sub-pixel G61 and a blue sub-pixel B61 are a pixel unit, and a red sub-pixel R62, a green sub-pixel G62 and a blue sub-pixel B62 are a pixel unit.

Exemplarily, as shown in FIG. 2, the green sub-pixel G11, the red sub-pixel R21, the green sub-pixel G31, the red sub-pixel R41, the green sub-pixel G51 and the red sub-pixel R61 are coupled with the data line DA2. The blue sub-pixel B11, the green sub-pixel G21, the blue sub-pixel B31, the green sub-pixel G41, the blue sub-pixel B51 and the green sub-pixel G61 are coupled with the data line DA3. The red sub-pixel R12, the blue sub-pixel B21, the red sub-pixel R32, the blue sub-pixel B41, the red sub-pixel R52 and the blue sub-pixel B61 are coupled with the data line DA4. The green sub-pixel G12, the red sub-pixel R22, the green sub-pixel G32, the red sub-pixel R42, the green sub-pixel G52 and the red sub-pixel R62 are coupled with the data line DA5. The blue sub-pixel B12, the green sub-pixel G22, the blue sub-pixel B32, the green sub-pixel G42, the blue sub-pixel B52 and the green sub-pixel G62 are coupled with the data line DA6.

Figure 3:
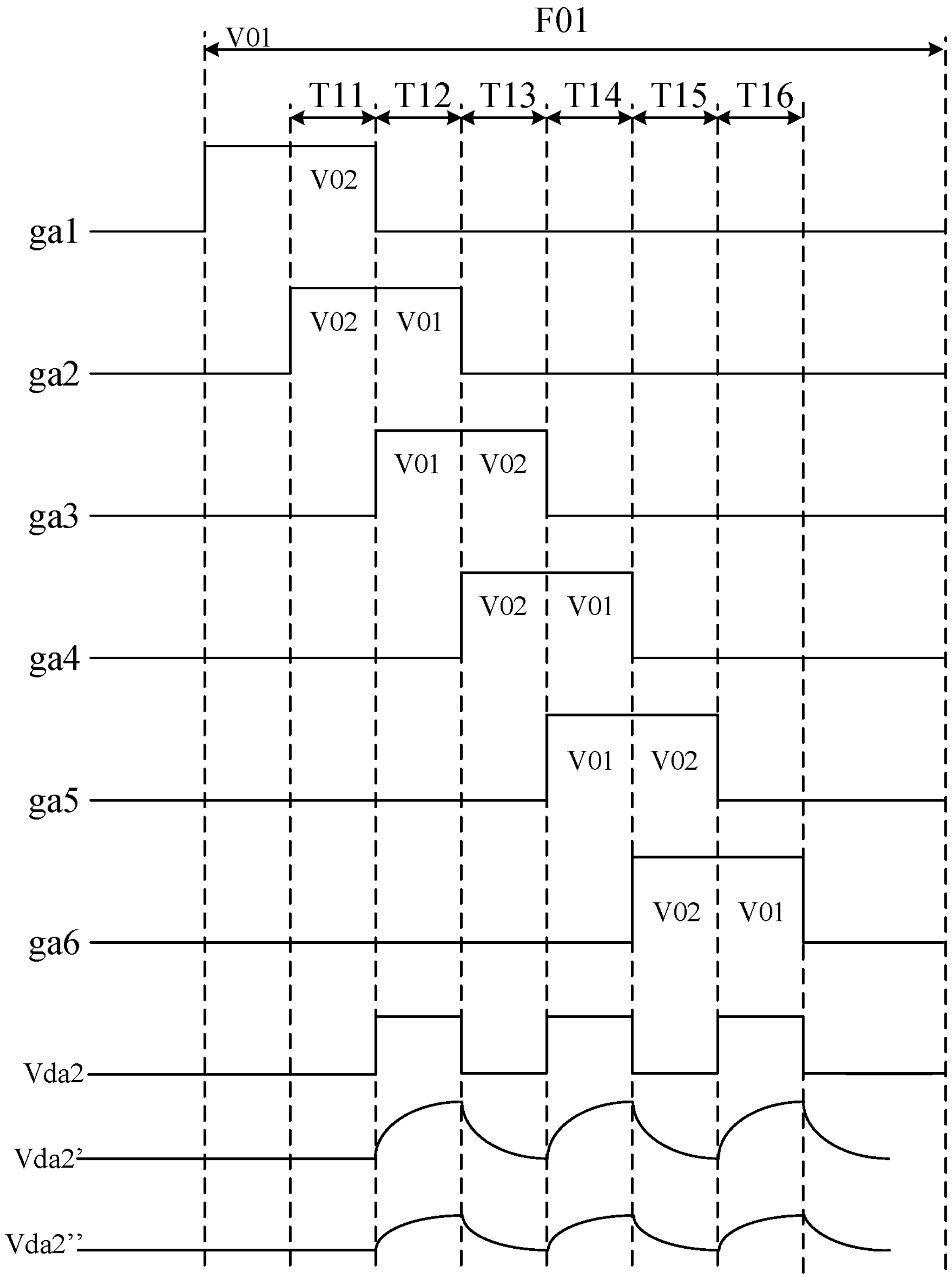
FIG. 3 is a diagram of some signal timings in an embodiment of the present disclosure.
Figure 4:
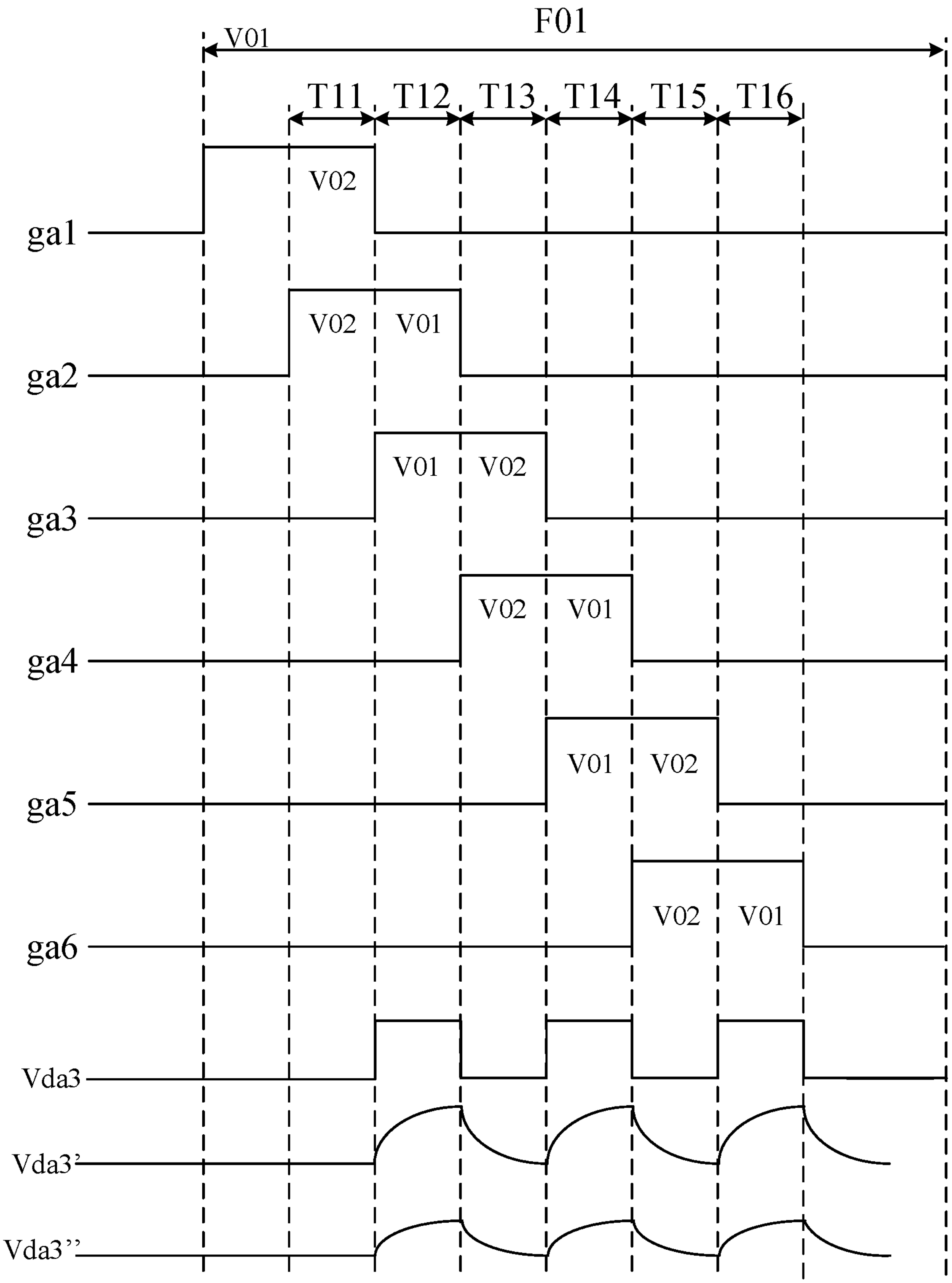
FIG. 4 is a diagram of some other signal timings in an embodiment of the present disclosure.

Exemplarily, a situation that the formed reloading image is displayed by a first row of sub-pixels corresponding to a gray scale value of 0, a second row of sub-pixels corresponding to a gray scale value of 192, a third row of sub-pixels corresponding to the gray scale value of 0, a fourth row of sub-pixels corresponding to the gray scale value of 192, a fifth row of sub-pixels corresponding to the gray scale value of 0, and a sixth row of sub-pixels corresponding to the gray scale value of 192 is taken as an example, shown in FIG. 2 to FIG. 4, a process of driving the display panel to display the reloading image may be described as follows, ga1 represents a signal loaded on the gate line GA1, ga2 represents a signal loaded on the gate line GA2, ga3 represents a signal loaded on the gate line GA3, ga4 represents a signal loaded on the gate line GA4, ga5 represents a signal loaded on the gate line GA5, and ga6 represents a signal loaded on the gate line GA6, Vda2 represents a data voltage loaded on the data line DA2, and Vda3 represents a data voltage loaded on the data line DA3. In addition, a high level in the signals ga1-ga6 may be taken as a gate turning-on signal, so as to control the transistors in the sub-pixels to be turned on. Taking a display frame F01, the data lines DA2 and DA3 and a sub-pixel connected with the data lines DA2 and DA3 as an example, when the signal ga1 on the gate line GA1 outputs the gate turning-on signal of the high level, the transistors in the green sub-pixel G11 and the blue sub-pixel B11 are turned on.

In a data charging stage T11 corresponding to the high level of the signal ga1, a data voltage V02 corresponding to the gray scale value of 0 is loaded on the data line DA2 connected with the green sub-pixel G11, such that the green sub-pixel G11 is input to the target data voltage V02. In the data charging stage T11, a signal ga2 on the gate line GA2 outputs the gate turning-on signal of the high level, and the transistor in the red sub-pixel R21 is turned on. The data voltage V02 is input to the red sub-pixel R21 at the same time, so as to pre-charge the red sub-pixel R21. In addition, in the data charging stage T11 corresponding to the high level of the signal ga1, the data voltage V02 corresponding to the gray scale value of 0 is loaded on the data line DA3 connected with the blue sub-pixel B11, such that the blue sub-pixel B11 is input to the target data voltage V02. In the data charging stage T11, a signal ga2 on the gate line GA2 outputs the gate turning-on signal of the high level, and the transistor in the green sub-pixel G21 is turned on. The data voltage V02 is input to the green sub-pixel G21 at the same time, so as to pre-charge the green sub-pixel G21.

Moreover, in a data charging stage T12 corresponding to the high level of the signal ga2, a data voltage V01 corresponding to the gray scale value of 192 is loaded on the data line DA2 connected with the red sub-pixel R21, such that the red sub-pixel R21 is charged with the target data voltage V01. In the data charging stage T12, a signal ga3 on the gate line GA3 outputs the gate turning-on signal of the high level, and the transistor in the green sub-pixel G31 is turned on. The data voltage V01 is input to the green sub-pixel G31 at the same time, so as to pre-charge the green sub-pixel G31. In addition, in the data charging stage T12 corresponding to the high level of the signal ga2, the data voltage V01 corresponding to the gray scale value of 192 is loaded on the data line DA3 connected with the green sub-pixel G21, such that the green sub-pixel G21 is charged with the target data voltage V01. In the data charging stage T12, a signal ga3 on the gate line GA3 outputs the gate turning-on signal of the high level, and the transistor in the blue sub-pixel B31 is turned on. The data voltage V01 is input to the blue sub-pixel B31 at the same time, so as to pre-charge the blue sub-pixel B31.

Moreover, in a data charging stage T13 corresponding to the high level of the signal ga3, the data voltage V02 corresponding to the gray scale value of 0 is loaded on the data line DA2 connected with the green sub-pixel G31, such that the green sub-pixel G31 is charged with the target data voltage V02. In the data charging stage T13, a signal ga4 on the gate line GA4 outputs the gate turning-on signal of the high level, and the transistor in the red sub-pixel R41 is turned on. The data voltage V02 is input to the red sub-pixel R41 at the same time, so as to pre-charge the red sub-pixel R41. In addition, in the data charging stage T13 corresponding to the high level of the signal ga3, the data voltage V02 corresponding to the gray scale value of 0 is loaded on the data line DA3 connected with the blue sub-pixel B31, such that the blue sub-pixel B31 is charged with the target data voltage V02. In the data charging stage T13, the signal ga4 on the gate line GA4 outputs the gate turning-on signal of the high level, and the transistor in the green sub-pixel G41 is turned on. The data voltage V02 is input to the green sub-pixel G41 at the same time, so as to pre-charge the green sub-pixel G41.

Moreover, in a data charging stage T14 corresponding to the high level of the signal ga4, the data voltage V01 corresponding to the gray scale value of 192 is loaded on the data line DA2 connected with the red sub-pixel R41, such that the red sub-pixel R41 is charged with the target data voltage V01. In the data charging stage T14, a signal ga5 on the gate line GA5 outputs the gate turning-on signal of the high level, and the transistor in the green sub-pixel G51 is turned on. The data voltage V01 is input to the green sub-pixel G51 at the same time, so as to pre-charge the green sub-pixel G51. In addition, in the data charging stage T14 corresponding to the high level of the signal ga4, the data voltage V01 corresponding to the gray scale value of 192 is loaded on the data line DA3 connected with the green sub-pixel G41, such that the green sub-pixel G41 is charged with the target data voltage V01. In the data charging stage T14, a signal ga5 on the gate line GA5 outputs the gate turning-on signal of the high level, and the transistor in the blue sub-pixel B51 is turned on. The data voltage V01 is input to the blue sub-pixel B51 at the same time, so as to pre-charge the blue sub-pixel B51.

Moreover, in a data charging stage T15 corresponding to the high level of the signal ga5, the data voltage V02 corresponding to the gray scale value of 0 is loaded on the data line DA2 connected with the green sub-pixel B51, such that the green sub-pixel B51 is charged with the target data voltage V02. In the data charging stage T15, a signal ga6 on the gate line GA6 outputs the gate turning-on signal of the high level, and the transistor in the red sub-pixel R61 is turned on. The data voltage V02 is input to the red sub-pixel R51 at the same time, so as to pre-charge the red sub-pixel R51. In addition, in the data charging stage T15 corresponding to the high level of the signal ga5, the data voltage V02 corresponding to the gray scale value of 0 is loaded on the data line DA3 connected with the blue sub-pixel B51, such that the blue sub-pixel B51 is charged with the target data voltage V02. In the data charging stage T15, a signal ga6 on the gate line GA6 outputs the gate turning-on signal of the high level, and the transistor in the green sub-pixel G61 is turned on. The data voltage V02 is input to the green sub-pixel G61 at the same time, so as to pre-charge the green sub-pixel G61.

Moreover, in a data charging stage T16 corresponding to the high level of the signal ga6, the data voltage V01 corresponding to the gray scale value of 192 is loaded on the data line DA2 connected with the red sub-pixel R61, such that the red sub-pixel R61 is charged with the target data voltage V01, and the next sub-pixel is pre-charged. In addition, in the data charging stage T16 corresponding to the high level of the signal ga6, the data voltage V01 corresponding to the gray scale value of 192 is loaded on the data line DA3 connected with the green sub-pixel G61, such that the green sub-pixel G61 is charged with the target data voltage V01, and the next sub-pixel is pre-charged. Implementations of other sub-pixels are analogized in the same way until the sub-pixels in the whole display panel are charged with the data voltages, which will not be repeated here.

It can be seen from the above description that as shown in FIG. 3 and FIG. 4, Vda2' in FIG. 3 represents charging in an ideal state of the sub-pixels connected with the data line DA2, and Vda2" represents actual charging of the sub-pixels connected with the data line DA2. Vda3" in FIG. 4 represents charging in the ideal state of the sub-pixels connected with the data line DA3, and Vda3" represents actual charging of the sub-pixels connected with the data line DA3. It can be seen from this that if the previous row of data voltages that a sub-pixel is pre-charged with are not completely refreshed by the target data voltage to be charged, the sub-pixel will be under-charged, and it will show serial.

Figure 5:
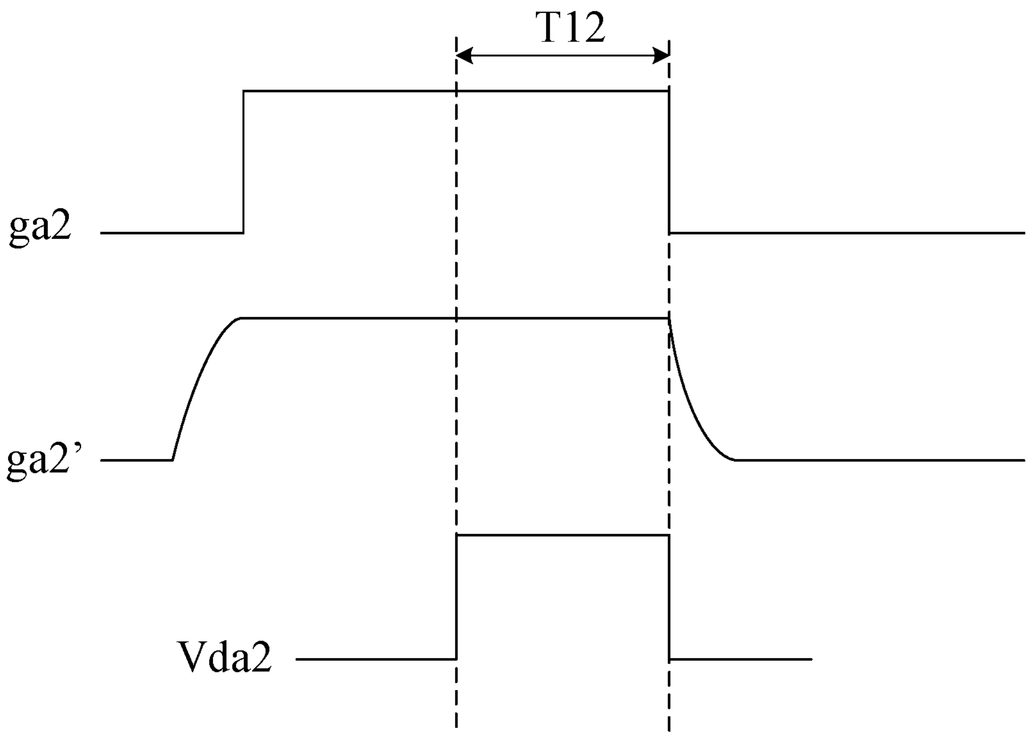
FIG. 5 is a diagram of some yet other signal timings in an embodiment of the present disclosure.

It can be seen from the above description, as shown in FIG. 5, ga2 represents a signal in an ideal state transmitted on the gate line GA2, ga2' represents a signal in an actual state transmitted on the gate line GA2, and Vda2 represents a signal transmitted on the data line DA2 in a stage T12. In the stage T12, a red sub-pixel R21 corresponds to a target data voltage V01 of a gray scale value of 192, and in a stage T13, a green sub-pixel G31 corresponds to a target data voltage V02 of a gray scale value of 0. In this way, after the red sub-pixel R21 is charged with the target data voltage V01, the target data voltage V02 corresponding to the green sub-pixel G31 is input to the data line DA2. However, in practical applications, a falling edge of the signal ga2' transmitted on the gate line GA2 will have a large delay, resulting in that after the target data voltage V02 corresponding to the green sub-pixel G31 is input to the data line DA2, the red sub-pixel R21 has not been completely turned off, thereby causing the red sub-pixel R21 to be charged with the target data voltage V02 corresponding to the green sub-pixel G31, resulting in an insufficient charging rate, leading to serial. As a result, black lines in the above reloading image are not black enough, and white lines are not white enough. Even when the serial is serious, the above reloading image may be all bright for all rows.

Figure 6:
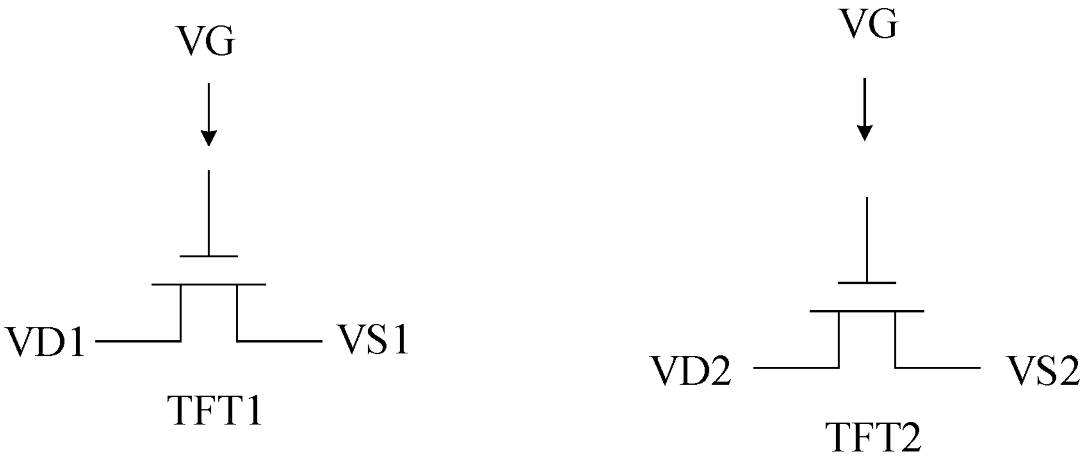
FIG. 6 is a schematic structural diagram of some transistors in an embodiment of the present disclosure.

When the display panel is driven for displaying, different flipping methods may be adopted to avoid liquid crystal polarization. The sub-pixels input with the target data voltages with positive polarity are defined as positive sub-pixels, and the sub-pixels input with the target data voltages with negative polarity are defined as negative sub-pixels. In practical applications, the charging rates of the positive sub-pixels may be different from the charging rates of the negative sub-pixels. Since a bias voltage state of a transistor TFT1 in the positive sub-pixel is inconsistent with a bias voltage state of a transistor TFT2 in the negative sub-pixel, on-state currents of the transistor TFT1 and the transistor TFT2 are different from each other. Generally, in a layout structure of the display panel, a source and a drain of the transistor are arranged in a symmetrical structure, so that the source and the drain are equivalent. For example, as shown in FIG. 6, when the transistor TFT1 works, a voltage VG loaded on its gate may be 30 V, a voltage VD1 of one of the source and the drain may be 16 V. and a voltage VS1 of the other one of the source and the drain may be 8 V, so that a bias voltage of the transistor TFT1 when it works is (VG−VS1)=22 V. When the transistor TFT2 works, a voltage VG loaded on its gate may be 30 V, a voltage VD2 of one of the source and the drain may be 0 V, and a voltage VS2 of the other one of the source and the drain may be 8 V, so that a bias voltage of the transistor TFT2 when it works is (VG−VD2)=30 V. In this way, the bias voltage of the transistor TFT2 when it works is larger than the bias voltage of the transistor TFT1 when it works, so that the on-state currents of the transistor TFT2 when it works are larger than the on-state currents of the transistor TFT1 when it works, and charging of the negative sub-pixels is better than charging of the positive sub-pixels.

Figure 7:
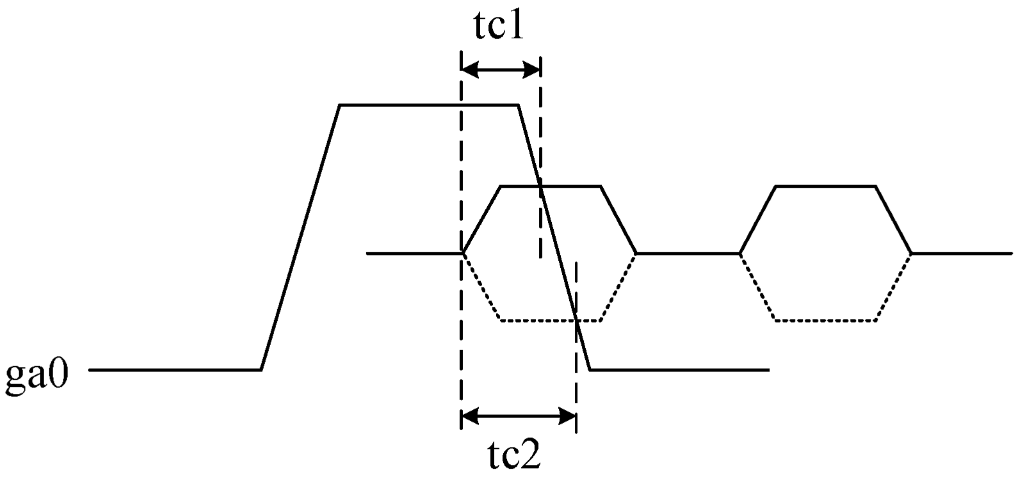
FIG. 7 is a diagram of some yet other signal timings in an embodiment of the present disclosure.

As shown in FIG. 6 and FIG. 7, in practical applications, a falling edge of a signal ga1 transmitted on the gate line will have a large delay, which causes a gate voltage VG of the transistor to continuously drop in a turn-off process, resulting in inconsistent turn-off time points of the transistor TFT1 and the transistor TFT2, which leads to the difference between the charging of the negative sub-pixels and the charging of the positive sub-pixels. Specifically, as for the transistor TFT1, when VG drops from 30 V to 16 V, the bias voltage of the transistor TFT1 is (VG−VD1)=0 V. At this time, the voltage between the source and the drain is also in a very small state (about 1 V), and TFT1 is basically in an off state. As for the transistor TFT2, when VG drops from 30 V to 0 V, the bias voltage of the transistor TFT2 is (VG−VD2)=0 V. At this time, the voltage between the source and the drain is also in a very small state (about 1 V), and TFT2 is basically in the off state. Therefore, a charging time duration tc1 of the positive sub-pixel is less than a charging time duration tc2 of the negative sub-pixel, so that the charging of the negative sub-pixel is better than the charging of the positive sub-pixel.

Figure 8:
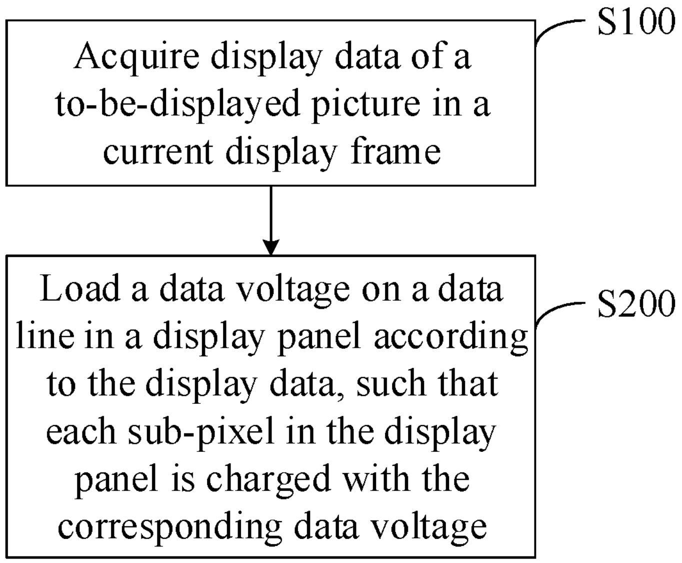
FIG. 8 is some flow charts of a driving method in an embodiment of the present disclosure.

To sum up, due to the difference in the charging rate among the sub-pixels, the display panel may have a problem of poor display. In order to improve the problem of charging rate difference, an embodiment of the present disclosure provides a driving method for the display panel, and as shown in FIG. 8, the driving method may include the following steps.

S100, display data of a to-be-displayed image in a current display frame is acquired.

Exemplarily, the acquired display data may include digital signal forms of data voltages, which are provided with gray scale values corresponding to the data voltages, corresponding to sub-pixels one to one. In this way, the gray scale value corresponding to each sub-pixel may be determined according to the display data of each sub-pixel.

S200, a data voltage is loaded on a data line in the display panel according to the display data, such that each sub-pixel in the display panel is charged with the corresponding data voltage.

Exemplarily, taking the green sub-pixel G21 as an example, a data voltage of a gray scale value may be input to the data line according to the gray scale value in the acquired display data corresponding to the green sub-pixel G21, such that the green sub-pixel G21 is charged with the target data voltage of the gray scale value. The other sub-pixels are done in the same way, which will not be repeated here.

According to the driving method for the display panel provided by the embodiment of the present disclosure, since a first target duration is between an end time point of a voltage conversion edge when the data line is loaded with a positive data voltage and a start time point of a data charging stage corresponding to the sub-pixel charged with the positive data voltage, and a second target duration is between an end time point of a voltage conversion edge when the data line is loaded with a negative data voltage and a start time point of a data charging stage corresponding to the sub-pixel charged with the negative data voltage, the second target duration is larger than the first target duration, so that the time point for a negative sub-pixel to be charged with a maximum value of the target data voltage is later than the time point for a positive sub-pixel to be charged with the maximum value of the target data voltage, which may be equivalent to reducing the charging rate of the negative sub-pixel and increasing the charging rate of the positive sub-pixel, so as to reduce the charging rate difference between the positive sub-pixel and the negative sub-pixel as much as possible, and the problem of poor display of the display panel is improved.

Figure 9:
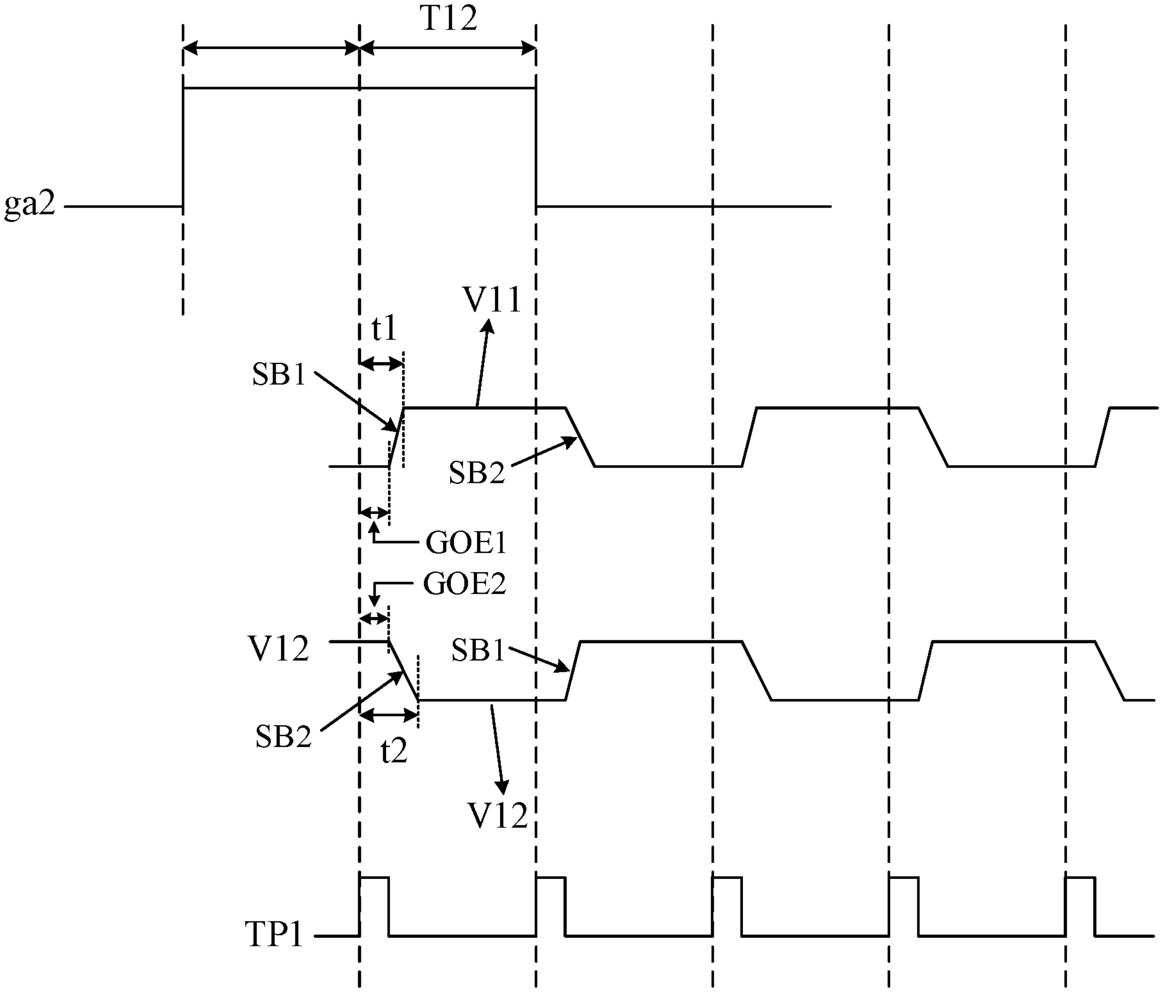
FIG. 9 is a diagram of some yet other signal timings in an embodiment of the present disclosure.

Exemplarily, as shown in FIG. 9, a sub-pixel charged with the positive data voltage may refer to the positive sub-pixel. That is, the sub-pixel is a positive sub-pixel charged with a target data voltage V11. A sub-pixel charged with the negative data voltage may refer to the negative sub-pixel. That is, the sub-pixel is a negative sub-pixel charged with a target data voltage V12. SB1 represents a voltage conversion edge when the positive data voltage is loaded on the data line DA2, moreover, when the data line DA2 is switched from a previous data voltage to the positive data voltage V11, there will be a charge-discharge process, and the charge-discharge process forms the voltage conversion edge SB1, SB2 represents a voltage conversion edge when the negative data voltage is loaded on the data line DA2. Moreover, when the data line DA2 is switched from a previous data voltage to the negative data voltage V12, there will be a charge-discharge process, and the charge-discharge process forms the voltage conversion edge SB2. A first target duration t1 is between an end time point of the voltage conversion edge SB1 when the positive data voltage V11 is loaded on the data line DA2 and a start time point of the data charging stage T12 corresponding to the sub-pixel which is to be charged with the positive data voltage V11 as the target data voltage. A second target duration t2 is between an end time point of the voltage conversion edge SB2 when the negative data voltage V12 is loaded on the data line DA2 and a start time point of the data charging stage T12 corresponding to the sub-pixel which is charged with the negative data voltage V12 as the target data voltage. The second target duration t2 is larger than the first target duration t1, so that the time point for the negative sub-pixel to be charged with the maximum value of the target data voltage is later than the time point for the positive sub-pixel to be charged with the maximum value of the target data voltage, which may be equivalent to reducing the charging rate of the negative sub-pixel and increasing the charging rate of the positive sub-pixels, so as to reduce the charging rate difference between the positive sub-pixel and the negative sub-pixel as much as possible, and the problem of poor display of the display panel is improved.

In some embodiments of the present disclosure, as shown in FIG. 9, a voltage conversion rate of the voltage conversion edge SB1 when the data line is loaded with the positive data voltage may be set as a first conversion rate, and a voltage conversion rate of the voltage conversion edge SB2 when the data line is loaded with the negative data voltage may be set as a second conversion rate. In this way, the positive data voltage may be loaded on a data line according to the first conversion rate, and the negative data voltage may be loaded on a data line according to the second conversion rate.

In some embodiments of the present disclosure, the start time point of the voltage conversion edge when the data line is loaded with the positive data voltage is later than the start time point of the data charging stage corresponding to the sub-pixel charged with the positive data voltage, and a first interval duration is between the start time point of the voltage conversion edge when the data line is loaded with the positive data voltage and the start time point of the data charging stage corresponding to the sub-pixel charged with the positive data voltage. In addition, the start time point of the voltage conversion edge when the data line is loaded with the negative data voltage is later than the start time point of the data charging stage corresponding to the sub-pixel charged with the negative data voltage, and a second interval duration is between the start time point of the voltage conversion edge when the data line is loaded with the negative data voltage and the start time point of the data charging stage corresponding to the sub-pixel charged with the negative data voltage. Exemplarily, as shown in FIG. 9, the start time point of the voltage conversion edge SB1 when the data line DA2 is loaded with the positive data voltage V11 is later than the start time point of the data charging stage T12 corresponding to the sub-pixel which is to be charged with the positive data voltage V11 as the target data voltage. In addition, a first interval duration GOE1 is between the start time point of the voltage conversion edge SB1 when the data line DA2 is loaded with the positive data voltage V11 and the start time point of the data charging stage T12. The start time point of the voltage conversion edge SB2 when the data line DA2 is loaded with the negative data voltage V12 is later than the start time point of the data charging stage T12 corresponding to the sub-pixel which is to be charged with the negative data voltage V12 as the target data voltage. In addition, a second interval duration GOE2 is between the start time point of the voltage conversion edge SB2 when the data line DA2 is loaded with the negative data voltage V12 and the start time point of the data charging stage T12. In this way, when the positive data voltage is loaded to the data line may be decided according to the first interval duration GOE1, and when the negative data voltage is loaded to the data line may be decided according to the second interval duration GOE2.

In some embodiments of the present disclosure, after step S100 and before step S200, the method may further include that the first conversion rate and the second conversion rate are determined, so as to determine the rates of the positive data voltage and the negative data voltage loaded to the data lines. In this way, the data voltage may be loaded on the data line in the display panel by adopting the determined first conversion rate and second conversion rate according to the display data. Therefore, the second target duration t2 is larger than the first target duration t1, so that the time point for the negative sub-pixel to be charged with the maximum value of the target data voltage is later than the time point for the positive sub-pixel to be charged with the maximum value of the target data voltage, which may be equivalent to reducing the charging rate of the negative sub-pixel and increasing the charging rate of the positive sub-pixel, so as to reduce the charging rate difference between the positive sub-pixel and the negative sub-pixel as much as possible, and the problem of poor display of the display panel is improved.

In some embodiments of the present disclosure, the determined second conversion rate may be less than the determined first conversion rate. Exemplarily, as shown in FIG. 9, a time duration for the negative data voltage V12 to be loaded on the data line and charged to a target value is longer than a time duration for the positive data voltage V11 to be loaded on the data line and charged to the target value, such that a time point for the negative sub-pixel to be charged with a maximum value of the target data voltage V12 is later than a time point for the positive sub-pixel to be charged with a maximum value of the target data voltage V11, which may be equivalent to reducing the charging rate of the negative sub-pixel and increasing the charging rate of the positive sub-pixel, so as to reduce the charging rate difference between the positive sub-pixel and the negative sub-pixel as much as possible, and the problem of poor display of the display panel is improved.

In some embodiments of the present disclosure, the determining the first conversion rate and the second conversion rate may include: two set voltage conversion rates are selected from a plurality of different set voltage conversion rates which are pre-stored, a larger one of the two selected set voltage conversion rates is taken as the first conversion rate, and a smaller one of the two selected set voltage conversion rates is taken as the second conversion rate. Exemplarily, taking n=4 as an example, set voltage conversion rates K_2 and K_3 may be selected from set voltage conversion rates K_1, K_2, K_3 and K_4, the set voltage conversion rate K_3 is taken as the first conversion rate, and the set voltage conversion rate K_2 is taken as the second conversion rate.

Exemplarily, a timing controller may further determine the first conversion rate and the second conversion rate, generate a first rate control signal represented by a digital signal according to the determined first conversion rate, generate a second rate control signal represented by a digital signal according to the determined second conversion rate, and output the first rate control signal corresponding to the first conversion rate and the second rate control signal corresponding to the second conversion rate to a source driving circuit. In this way, the source driving circuit may receive the first rate control signal and the second rate control signal which are represented by the digital signals, so that the source driving circuit may load the data voltages on the data lines in the display panel according to the received first rate control signal, second rate control signal and the display data, and each sub-pixel in the display panel is charged with the corresponding data voltage.

Figure 12:
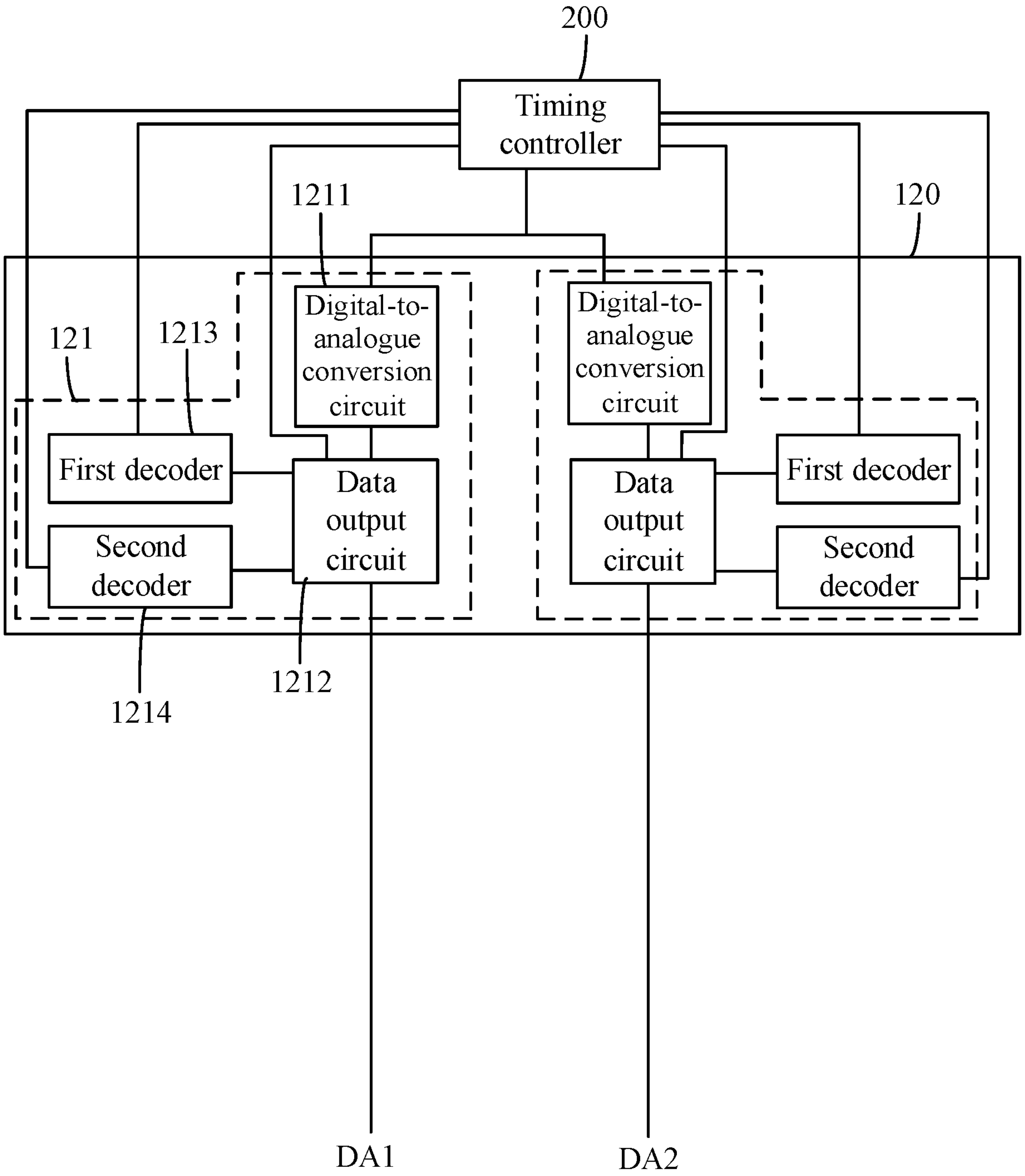
FIG. 12 is a diagram of some yet other signal timings of a display apparatus in an embodiment of the present disclosure.

Exemplarily, as shown in FIG. 12, the source driving circuit 120 may include: a plurality of voltage output circuits 121, and one data line is electrically connected with one voltage output circuit. Each voltage output circuit is configured to load the data voltage on the electrically connected data line according to the received first rate control signal and the second rate control signal and based on the display data. For example, the data line DA1 is electrically connected with a voltage output circuit 121, and the data line DA2 is electrically connected with the other voltage output circuit 121. Taking the voltage output circuit 121 connected with the data line DA1 as an example, the voltage output circuit 121 may load the data voltage on the data line DA1 electrically connected to the voltage output circuit 121 according to the received first rate control signal and second rate control signal and based on the display data. For example, the voltage output circuit 121 may output the positive data voltage to the data line DA1 according to the first rate conversion signal and based on the display data, and output the negative data voltage to the data line DA1 according to the second rate conversion signal and based on the display data. It should be noted that the working principle of other voltage output circuits 121 connected with the data lines is basically the same as that of the voltage output circuit 121, which will not be repeated here.

Exemplarily, as shown in FIG. 12, the voltage output circuit 121 may include: a digital-to-analogue conversion circuit 1211, a data output circuit 1212, a first decoder 1213 and a second decoder 1214, the first decoder may obtain a first rate conversion signal through decoding according to the first rate control signal represented by the digital signal, and output the first rate conversion signal to the data output circuit 1212. The second decoder may obtain a second rate conversion signal through decoding according to the second rate control signal represented by the digital signal, and output the second rate conversion signal to the data output circuit 1212. The digital-to-analogue conversion circuit 1211 may receive the display data represented by the digital signal, perform digital-to-analogue conversion on the received display data to obtain display data represented by an analog voltage, and output the display data represented by the analog voltage to the data output circuit 1212. The data output circuit 1212 may receive, display and output the first rate conversion signal and the second rate conversion signal, output the corresponding positive data voltage to the electrically connected data line according to the first rate conversion signal and based on the display data output by the digital-to-analogue conversion circuit, and output the corresponding negative data voltage to the electrically connected data line according to the second rate conversion signal and based on the display data output by the digital-to-analogue conversion circuit.

Exemplarily, taking n=4 as an example. Table 1 illustrates digital signals corresponding to different set voltage conversion rates. A digital signal corresponding to a set voltage conversion rate K_1 may be 0000, a digital signal corresponding to a set voltage conversion rate K_2 may be 0101, a digital signal corresponding to a set voltage conversion rate K_3 may be 1010, and a digital signal corresponding to a set voltage conversion rate K_4 may be 1111.

Exemplarily, taking a situation that the set voltage conversion rate K_3 is taken as the first conversion rate and the set voltage conversion rate K_2 is taken as the second conversion rate as an example, the Table 1 is stored in the timing controller 200, after determining the set voltage conversion rate K_3 as the first conversion rate, 1010 may be taken as the first rate control signal to be sent to the first decoder 1213. After receiving 1010, the first decoder 1213 may obtain the first rate conversion signal corresponding to 1010 through decoding. The first rate conversion signal is sent to the data output circuit 1212. In this way, the data output circuit 1212 may output the positive data voltage to the data line electrically connected to the data output circuit 1212 according to the first rate conversion signal and based on the display data output by the digital-to-analogue conversion circuit. After determining the set voltage conversion rate K_2 as the second conversion rate, the timing controller 200 may take 0101 as the second rate control signal to send it to the first decoder 1213. After receiving 0101, the first decoder 1213 may obtain the second rate conversion signal corresponding to 0101 through decoding. The second rate conversion signal is sent to the data output circuit 1212. In this way, the data output circuit 1212 may output the corresponding negative data voltage to the data line electrically connected to the data output circuit 1212 according to the second rate conversion signal and based on the display data output by the digital-to-analogue conversion circuit. It should be noted that Table 1 is only for example, and in practical applications, it may further adopt other representation forms, which is not limited here.

TABLE 1

| Set voltage conversion rate | Digital signal |
|---|---|
| K_1 | 0000 |
| K_2 | 0101 |
| K_3 | 1010 |
| K_4 | 1111 |

In some embodiments of the present disclosure, the data voltage may be triggered by a set edge of a data trigger signal and is input to the data line. In addition, the set edge is one of a rising edge and a falling edge, and the start time point of the voltage conversion edge of the data voltage is aligned with the corresponding set edge. Exemplarily, as shown in FIG. 9, the set edge may be set as the falling edge, and the data voltage is triggered by the falling edge of a data trigger signal TP1 and input to the data line. Alternatively, the set edge may also be set as the rising edge, and the data voltage is triggered by the rising edge of the data trigger signal TP1 and input to the data line. Since the first interval duration and the second interval duration are the same, pulse widths of the data trigger signals TP1 respectively corresponding to the positive data voltage and the negative data voltage may be the same, so that the same data trigger signal TP1 may be adopted for triggering, the design difficulty of the data trigger signal is reduced, and the calculation amount and the power consumption are reduced.

Exemplarily, as shown in FIG. 9, taking n=4 as an example, the digital signal forms of the data voltages, which are provided with gray scale values, corresponding to sub-pixels of the to-be-displayed image one to one may be acquired in the current display frame. In this way, the gray scale value corresponding to each sub-pixel may be determined according to the display data. The set voltage conversion rates K_2 and K_3 may be selected from the set voltage conversion rates K_1, K_2, K_3 and K_4, the set voltage conversion rate K_3 is taken as the first conversion rate, and the set voltage conversion rate K_2 is taken as the second conversion rate. The second conversion rate corresponding to the voltage conversion edge SB2 is less than the first conversion rate corresponding to the voltage conversion edge SB1. In this way, after entering the data charging stage, the first conversion rate (such as the set voltage conversion rate K_3) may be adopted to load the data voltage V11 on the data line, and the second conversion rate (such as the set voltage conversion rate K_2) may be adopted to load the data voltage V12 on the data line, so that the voltage conversion edge SB2 that jumps to the data voltage V11 is steeper than the voltage conversion edge SB2 that jumps to the data voltage V12. In this way, compared with making the voltage on the data line jump to a target value of the data voltage V12, the voltage on the data line may jump to a target value of the data voltage V11 in advance, such that the time point for the negative sub-pixel to be charged with a maximum value of the target data voltage is later than the time point for the positive sub-pixel to be charged with a maximum value of the target data voltage, which may be equivalent to reducing the charging rate of the negative sub-pixel and increasing the charging rate of the positive sub-pixel, so as to reduce the charging rate difference between the positive sub-pixel and the negative sub-pixel as much as possible, and the problem of poor display of the display panel is improved.

An embodiment of the present disclosure provides a driving method for some other display panels, and transformation is performed for the implementations in the above embodiments. Only the difference between the present embodiment and the above embodiments is explained below, and similarities are omitted here.

In some embodiments of the present disclosure, after step S100 and before step S200, the method may further include that a first interval duration and a second interval duration are determined, so as to determine time durations for the positive data voltage and the negative data voltage to be loaded to the data lines. In this way, the data voltages may be loaded on the data lines in the display panel by adopting the determined first interval duration and the second interval duration according to the display data. Therefore, the second target duration 12 is larger than the first target duration t1, so that the time point for the negative sub-pixel to be charged with the maximum value of the target data voltage is later than the time point for the positive sub-pixel to be charged with the maximum value of the target data voltage, which may be equivalent to reducing the charging rate of the negative sub-pixel and increasing the charging rate of the positive sub-pixel, so as to reduce the charging rate difference between the positive sub-pixel and the negative sub-pixel as much as possible, and the problem of poor display of the display panel is improved.

Figure 10:
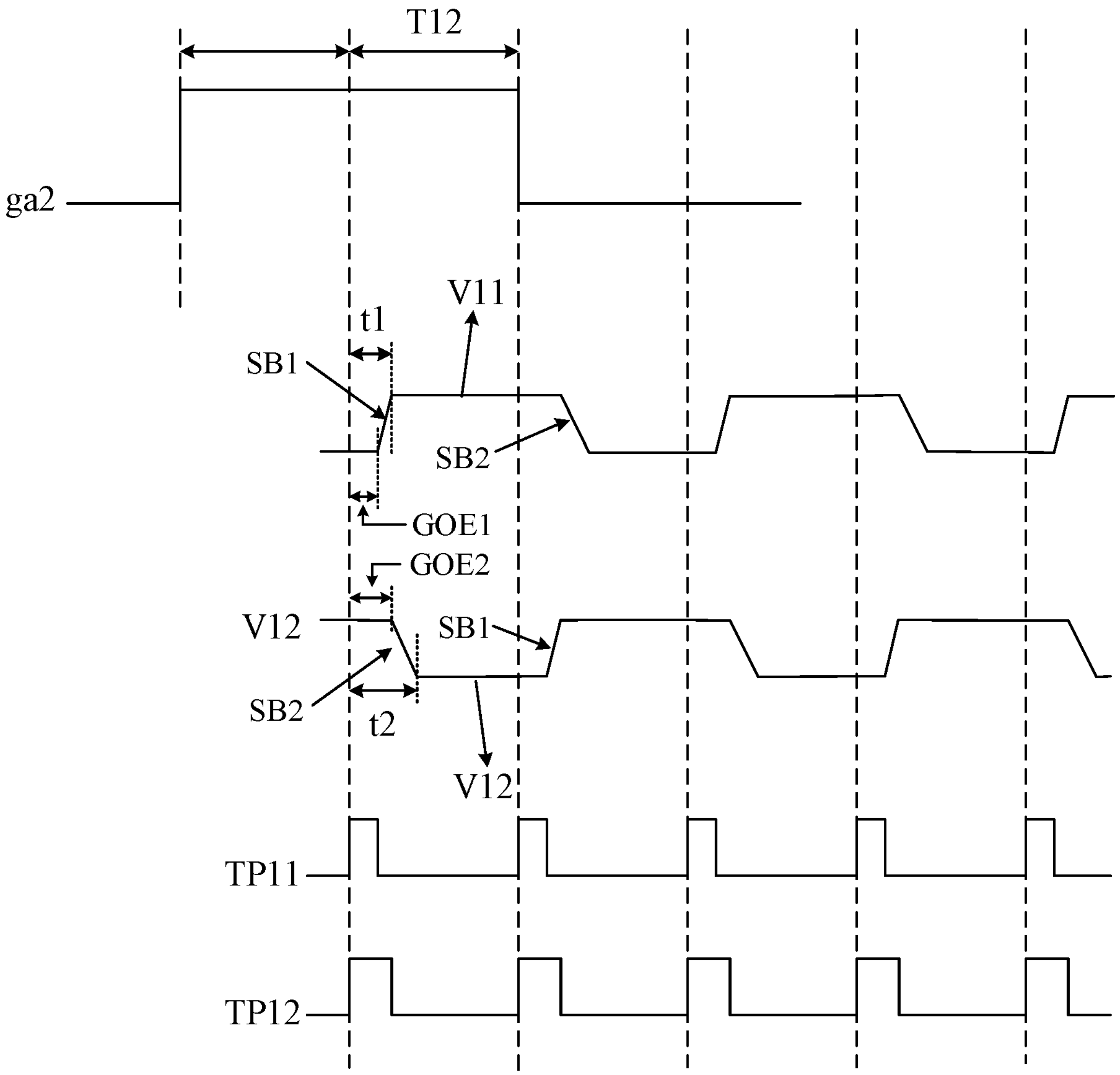
FIG. 10 is a diagram of some yet other signal timings in an embodiment of the present disclosure.

In some embodiments of the present disclosure, exemplarily, as shown in FIG. 10, the determined second interval duration GOE2 may be larger than the first interval duration GOE1. In this way, after entering the data charging stage, a data line may start to be loaded with the positive data voltage V11 after the first interval duration GOE1 to switch the previous data voltage to the current data voltage V11. A data line may start to be loaded with the negative data voltage V12 after the second interval duration GOE2 to switch the previous data voltage to the current data voltage V12. In this way, the time point for the negative sub-pixel to be charged with the maximum value of the target data voltage V12 may be further later than the time point for the positive sub-pixel to be charged with the maximum value of the target data voltage V11, which may be equivalent to reducing the charging rate of the negative sub-pixels and increasing the charging rate of the positive sub-pixel, so as to reduce the charging rate difference between the positive sub-pixel and the negative sub-pixel as much as possible, and the problem of poor display of the display panel is improved.

In some embodiments of the present disclosure, the determining the first interval duration and the second interval duration may include: two set interval durations are selected from a plurality of different set interval durations which are pre-stored, a larger one of the two selected set interval durations is taken as the second interval duration, and a smaller one of the two selected set interval durations is taken as the first interval duration. Exemplarily, two set interval durations Y_2 and Y_3 may be selected from set interval durations Y_1, Y_2, Y_3 and Y_4, the set interval duration Y_2 is taken as the first interval duration, and the set interval duration Y_3 is taken as the second interval duration.

In some embodiments of the present disclosure, the data voltage may be triggered by a set edge of a data trigger signal and input to the data line. In addition, the set edge is one of a rising edge and a falling edge, and the start time point of the voltage conversion edge of the data voltage is aligned with the corresponding set edge. Exemplarily, as shown in FIG. 10, the set edge may be set as the falling edge, the positive data voltage may be triggered by the falling edge of a data trigger signal TP11 and input to the data line, and the negative data voltage may be triggered by the falling edge of a data trigger signal TP12 and input to the data line. Pulses of the data trigger signal TP11 correspond to pulses of the data trigger signal TP12 one to one, and the rising edge of each pulse of the data trigger signal TP11 is aligned with the rising edge of the corresponding pulse in the data trigger signal TP12, so that the falling edge of each pulse of the data trigger signal TP12 is behind the falling edge of the corresponding pulse in the data trigger signal TP11. In addition, an interval duration between the falling edge of each pulse of the data trigger signal TP12 and the falling edge of the corresponding pulse in the data trigger signal TP11 is (GOE2−GOE1). Alternatively, the set edge may also be set as the rising edge, which is not limited here.

Exemplarily, taking m=4 as an example, Table 2 illustrates digital signals corresponding to different set interval durations. A digital signal corresponding to the set interval duration Y_1 may be 0001, a digital signal corresponding to the set interval duration Y_2 may be 0010, a digital signal corresponding to the set interval duration Y_3 may be 0110, and a digital signal corresponding to the set interval duration Y_4 may be 0111.

Exemplarily, taking a situation that the set interval duration Y_2 is taken as the first interval duration and the set interval duration Y_3 is taken as the second interval duration as an example, the Table 2 is stored in the timing controller 200, and after determining the set interval duration Y_2 as the first interval duration, the timing controller 200 may take 0010 as a first duration control signal. 0010 is also sent to the data output circuit 1212. In this way, the data output circuit 1212 may output the positive data voltage to the data line electrically connected to the data output circuit 1212 according to 0010 and based on the display data output by the digital-to-analogue conversion circuit. After determining the set interval duration Y_3 as the second interval duration, the timing controller 200 may take 0110 as a second duration control signal, 0110 is also sent to the data output circuit 1212. In this way, the data output circuit 1212 may output the negative data voltage to the data line electrically connected to the data output circuit 1212 according to 0110 and based on the display data output by the digital-to-analogue conversion circuit. It should be noted that Table 2 is only for example, and in practical applications, it may further adopt other representation forms, which is not limited here.

TABLE 2

| Set interval duration | Digital signal |
|---|---|
| Y_1 | 0001 |
| Y_2 | 0010 |
| Y_3 | 0110 |
| Y_4 | 0111 |

Exemplarily, as shown in FIG. 10, taking m=4 as an example, the digital signal forms of the data voltages, which are provided with gray scale values, corresponding to sub-pixels of the to-be-displayed image one to one may be acquired in the current display frame. In this way, the gray scale value corresponding to each sub-pixel may be determined according to the display data. Two set interval durations Y_2 and Y_3 may be selected from the set interval durations Y_1, Y_2, Y_3 and Y_4, the set interval duration Y_2 is taken as the first interval duration, and the set interval duration Y_3 is taken as the second interval duration. In this way, the second interval duration GOE2 may be larger than the first interval duration GOE1, after entering the data charging stage, the data line may start to be loaded with the positive data voltage V11 after the first interval duration GOE1 (such as the set interval duration Y_2), and the data line may start to be loaded with the negative data voltage V12 after the second interval duration GOE2 (such as the set interval duration Y_3). In this way, compared with making the voltage on the data line jump to a target value of the data voltage V12, the voltage on the data line may jump to a target value of the data voltage V11 in advance, such that the time point for the negative sub-pixel to be charged with a maximum value of the target data voltage is later than the time point for the positive sub-pixel to be charged with a maximum value of the target data voltage, which may be equivalent to reducing the charging rate of the negative sub-pixel and increasing the charging rate of the positive sub-pixel, so as to reduce the charging rate difference between the positive sub-pixel and the negative sub-pixel as much as possible, and the problem of poor display of the display panel is improved.

An embodiment of the present disclosure provides a driving method for some yet other display panels, and transformation is performed for the implementations in the above embodiments. Only the difference between the present embodiment and the above embodiments is explained below, and similarities are omitted here.

In some embodiments of the present disclosure, after step S100 and before step S200, the method may further include that a first conversion rate, a second conversion rate, a first interval duration and a second interval duration are determined, so as to determine time and rates for the positive data voltage and the negative data voltage to be loaded to the data lines. In this way, the data voltage may be loaded on the data line in the display panel by adopting the determined first conversion rate, second conversion rate, first interval duration and second interval duration according to the display data. Therefore, the second target duration t2 is larger than the first target duration t1, so that the time point for the negative sub-pixel to be charged with the maximum value of the target data voltage is later than the time point for the positive sub-pixel to be charged with the maximum value of the target data voltage, which may be equivalent to reducing the charging rate of the negative sub-pixel and increasing the charging rate of the positive sub-pixel, so as to reduce the charging rate difference between the positive sub-pixel and the negative sub-pixel as much as possible, and the problem of poor display of the display panel is improved.

In some embodiments of the present disclosure, the determined second conversion rate may be less than the determined first conversion rate. Exemplarily, as shown in FIG. 9, a time duration for the negative data voltage V12 to be loaded on the data line and charged to a target value is longer than a time duration for the positive data voltage V11 to be loaded on the data line and charged to the target value, such that a time point for the negative sub-pixel to be charged with a maximum value of the target data voltage V12 is later than a time point for the positive sub-pixel to be charged with a maximum value of the target data voltage V11, which may be equivalent to reducing the charging rate of the negative sub-pixel and increasing the charging rate of the positive sub-pixel, so as to reduce the charging rate difference between the positive sub-pixel and the negative sub-pixel as much as possible, and the problem of poor display of the display panel is improved.

In some embodiments of the present disclosure, the determined second interval duration may be equal to the determined first interval duration. In this way, when entering the data charging stage, the data line may start to be loaded with the positive data voltage and the negative data voltage after the same duration.

In some embodiments of the present disclosure, the timing controller pre-stores a plurality of different set voltage conversion rates. Exemplarily, the plurality of different set voltage conversion rates which are pre-stored may include: a set voltage conversion rate K_1, a set voltage conversion rate K_2, a set voltage conversion rate K_3 . . . and a set voltage conversion rate K_n. Where, n is an integer greater than 1. In addition, the set voltage conversion rates K_1 to K_n may increase sequentially. For example, taking n=4 as an example, K_1<K_2<K_3<K_4. In practical applications, a specific value of n may also be set as 2, 3, 5 and the like, and it may be determined according to requirements of the practical application, which is not limited here.

In some embodiments of the present disclosure, a difference between every two set voltage conversion rates in the sequentially increasing set voltage conversion rates may be the same. Exemplarily, taking n=4 as an example, it may be that (K_2−K_1)−(K_3−K_2)=(K_4−K_3). In this way, the voltage conversion rates of the voltage conversion edges may be increased in a stepped mode.

In some embodiments of the present disclosure, the timing controller pre-stores a plurality of different set interval durations. Exemplarily, the plurality of pre-stored different set interval durations may include a set interval duration Y_1, a set interval duration Y_2, a set interval duration Y_3 . . . and a set interval duration Y_m. Where, m is an integer greater than 1. In addition, the set interval durations Y_1 to Y_m may increase sequentially. For example, taking m=4 as an example, Y_1<Y_2<Y_3<Y_4. In practical applications, a specific value of m may also be set as 2, 3, 5 and the like, and it may be determined according to requirements of the practical application, which is not limited here.

In some embodiments of the present disclosure, a difference between every two set interval durations in the sequentially increasing set interval durations may be the same. Exemplarily, taking m=4 as an example, it may be that (Y_2−Y_1)=(Y_3−Y_2)=(Y_4−Y_3). In this way, the duration between the start time point of the voltage conversion edge and the start time point of the corresponding data charging stage may be increased in a stepped mode.

In some embodiments of the present disclosure, the determining the first conversion rate, the second conversion rate, the first interval duration and the second interval duration may include: two set voltage conversion rates are selected from a plurality of pre-stored different set voltage conversion rates, a larger one of the two selected set voltage conversion rates is taken as the first conversion rate, and a smaller one of the two selected set voltage conversion rates is taken as the second conversion rate; and one set interval duration is selected from a plurality of pre-stored different set interval durations as the first interval duration and the second interval duration. Exemplarily, taking n=4 and m=4 as an example, the set voltage conversion rates K_2 and K_3 may be selected from the set voltage conversion rates K_1, K_2, K_3 and K_4, the set voltage conversion rate K_3 is taken as the first conversion rate, and the set voltage conversion rate K_2 is taken as the second conversion rate; and the set interval duration Y_2 may be selected from the set interval durations Y_1, Y_2, Y_3 and Y_4, and the set interval duration Y_2 is taken as the first interval duration and the second interval duration.

Exemplarily, the timing controller may further determine the first conversion rate, the second conversion rate, the first interval duration and the second interval duration: generate a first rate control signal represented by a digital signal according to the determined first conversion rate, generate a second rate control signal represented by a digital signal according to the determined second conversion rate, generate a first duration control signal represented by a digital signal according to the determined first interval duration, and generate a second duration control signal represented by a digital signal according to the determined second interval duration; and output the first rate control signal corresponding to the first conversion rate, the second rate control signal corresponding to the second conversion rate, the first duration control signal corresponding to the first interval duration and the second duration control signal corresponding to the second interval duration to the source driving circuit. In this way: the source driving circuit may receive the first rate control signal, the second rate control signal, the first duration control signal and the second duration control signal which are represented by the digital signals, so that the source driving circuit may load the data voltages on the data lines in the display panel according to the received first rate control signal, the received second rate control signal, the received first duration control signal, the received second duration control signal and the display data, and each sub-pixel in the display panel is charged with the corresponding data voltage.

Exemplarily, as shown in FIG. 12, the source driving circuit 120 may include: a plurality of voltage output circuits 121, and one data line is electrically connected with one voltage output circuit. Each voltage output circuit is configured to load the data voltage on the electrically connected data line according to the received first rate control signal, the second rate control signal, the first duration control signal and the second duration control signal and based on the display data. For example, the data line DA1 is electrically connected with a voltage output circuit 121, and the data line DA2 is electrically connected with the other voltage output circuit 121. Taking the voltage output circuit 121 connected with the data line DA1 as an example, the voltage output circuit 121 may load the data voltage on the electrically connected data line DA1 according to the received first rate control signal, the received second rate control signal, the received first duration control signal and the received second duration control signal and based on the display data. For example, the voltage output circuit 121 may output the positive data voltage to the data line DA1 according to the first rate conversion signal and the first duration control signal and based on the display data, and output the negative data voltage to the data line DA1 according to the second rate conversion signal and the second duration control signal and based on the display data. It should be noted that the working principle of other voltage output circuits 121 connected with the data lines is basically the same as that of the voltage output circuit 121, which will not be repeated here.

Exemplarily, as shown in FIG. 12, the voltage output circuit 121 may include: a digital-to-analogue conversion circuit 1211, a data output circuit 1212, a first decoder 1213 and a second decoder 1214, the first decoder may obtain a first rate conversion signal through decoding according to the first rate control signal represented by the digital signal, and output the first rate conversion signal to the data output circuit 1212. The second decoder may obtain a second rate conversion signal through decoding according to the second rate control signal represented by the digital signal, and output the second rate conversion signal to the data output circuit 1212. The digital-to-analogue conversion circuit 1211 may receive the display data represented by the digital signal, perform digital-to-analogue conversion on the received display data to obtain display data represented by an analog voltage, and output the display data represented by the analog voltage to the data output circuit 1212. The data output circuit 1212 may receive, display and output the first rate conversion signal, the first duration control signal, the second rate conversion signal and the second duration control signal; output the corresponding positive data voltage to the electrically connected data line according to the first rate conversion signal and the first duration control signal and based on the display data output by the digital-to-analogue conversion circuit; and output the corresponding negative data voltage to the electrically connected data line according to the second rate conversion signal and the second duration control signal and based on the display data output by the digital-to-analogue conversion circuit.

Exemplarily, taking n=4 and m=4 as an example. Table 1 illustrates digital signals corresponding to different set voltage conversion rates. Table 2 illustrates digital signals corresponding to different set interval durations. A digital signal corresponding to a set voltage conversion rate K_1 may be 0000, a digital signal corresponding to a set voltage conversion rate K_2 may be 0101, a digital signal corresponding to a set voltage conversion rate K_3 may be 1010, and a digital signal corresponding to a set voltage conversion rate K_4 may be 1111. A digital signal corresponding to the set interval duration Y_1 may be 0001, a digital signal corresponding to the set interval duration Y_2 may be 0010, a digital signal corresponding to the set interval duration Y_3 may be 0110, and a digital signal corresponding to the set interval duration Y_4 may be 0111.

Exemplarily, taking a situation that the set voltage conversion rate K_3 is taken as the first conversion rate, the set voltage conversion rate K_2 is taken as the second conversion rate and the set interval duration Y_2 is taken as the first interval duration and the second interval duration as an example, the Table 1 and Table 2 are stored in the timing controller 200, after determining the set voltage conversion rate K_3 as the first conversion rate, 1010 may be taken as the first rate control signal to be sent to the first decoder 1213. After receiving 1010, the first decoder 1213 may obtain the first rate conversion signal corresponding to 1010 through decoding. The first rate conversion signal is sent to the data output circuit 1212. In addition, after determining the set interval duration Y_2 as the first interval duration, the timing controller 200 may take 0010 as the first duration control signal, 0010 is also sent to the data output circuit 1212. In this way, the data output circuit 1212 may output the corresponding positive data voltage to the data line electrically connected to the data output circuit 1212 according to the first rate conversion signal and 0010 and based on the display data output by the digital-to-analogue conversion circuit. After determining the set voltage conversion rate K_2 as the second conversion rate, the timing controller 200 may take 0101 as the second rate control signal to send it to the first decoder 1213. After receiving 0101, the first decoder 1213 may obtain the second rate conversion signal corresponding to 0101 through decoding. The second rate conversion signal is sent to the data output circuit 1212. In addition, after determining the set interval duration Y_2 as the second interval duration, the timing controller 200 may take 0010 as the second duration control signal, 0010 is also sent to the data output circuit 1212. In this way, the data output circuit 1212 may output the corresponding negative data voltage to the data line electrically connected to the data output circuit 1212 according to the second rate conversion signal and 0010 and based on the display data output by the digital-to-analogue conversion circuit. It should be noted that Table 1 and Table 2 are only for example, and in practical applications, it may further adopt other representation forms, which is not limited here.

Exemplarily, as shown in FIG. 9, taking n=4 and m=4 as an example, the digital signal forms of the data voltages, which are provided with gray scale values, corresponding to sub-pixels of the to-be-displayed image one to one may be acquired in the current display frame. In this way, the gray scale value corresponding to each sub-pixel may be determined according to the display data. The set voltage conversion rates K_2 and K_3 may be selected from the set voltage conversion rates K_1, K_2, K_3 and K_4, the set voltage conversion rate K_3 is taken as the first conversion rate, and the set voltage conversion rate K_2 is taken as the second conversion rate. The set interval duration Y_2 may be selected from the set interval durations Y_1, Y_2, Y_3 and Y_4, and the set interval duration Y_2 is taken as the first interval duration and the second interval duration. In this way, the second interval duration GOE2 may be equal to the first interval duration GOE1, and the second conversion rate corresponding to the voltage conversion edge SB2 is less than the first conversion rate corresponding to the voltage conversion edge SB1. In this way, after entering the data charging stage, the data line may be loaded with the data voltage V11 and the data voltage V12 at the same time. In addition, the first conversion rate (such as the set voltage conversion rate K_3) is adopted to load the data voltage V11 on the data line, the second conversion rate (such as the set voltage conversion rate K_2) is adopted to load the data voltage V12 on the data line, so that the voltage conversion edge SB2 that jumps to the data voltage V11 is steeper than the voltage conversion edge SB2 that jumps to the data voltage V12. In this way, compared with making the voltage on the data line jump to a target value of the data voltage V12, the voltage on the data line may jump to a target value of the data voltage V11 in advance, such that the time point for the negative sub-pixel to be charged with a maximum value of the target data voltage is later than the time point for the positive sub-pixel to be charged with a maximum value of the target data voltage, which may be equivalent to reducing the charging rate of the negative sub-pixel and increasing the charging rate of the positive sub-pixel, so as to reduce the charging rate difference between the positive sub-pixel and the negative sub-pixel as much as possible, and the problem of poor display of the display panel is improved.

An embodiment of the present disclosure provides a driving method for some other display panels, and transformation is performed for the implementations in the above embodiments. Only the difference between the present embodiment and the above embodiments is explained below; and similarities are omitted here.

In some embodiments of the present disclosure, the determined second conversion rate may be less than the determined first conversion rate. Exemplarily, as shown in FIG. 10, a time duration for the negative data voltage V12 to be loaded on the data line and charged to a target value is longer than a time duration for the positive data voltage V11 to be loaded on the data line and charged to the target value, such that a time point for the negative sub-pixel to be charged with a maximum value of the target data voltage V12 is later than a time point for the positive sub-pixel to be charged with a maximum value of the target data voltage V11, which may be equivalent to reducing the charging rate of the negative sub-pixel and increasing the charging rate of the positive sub-pixel, so as to reduce the charging rate difference between the positive sub-pixel and the negative sub-pixel as much as possible, and the problem of poor display of the display panel is improved.

In some embodiments of the present disclosure, the determining the first conversion rate and the second conversion rate may include: two set voltage conversion rates are selected from a plurality of pre-stored different set voltage conversion rates, a larger one of the two selected set voltage conversion rates is taken as the first conversion rate, and a smaller one of the two selected set voltage conversion rates is taken as the second conversion rate. Exemplarily, taking n=4 as an example, set voltage conversion rates K_2 and K_3 may be selected from set voltage conversion rates K_1, K_2, K_3 and K_4, the set voltage conversion rate K_3 is taken as the first conversion rate, and the set voltage conversion rate K_2 is taken as the second conversion rate.

In some embodiments of the present disclosure, exemplarily, as shown in FIG. 10, the determined second interval duration GOE2 may be larger than the first interval duration GOE1. In this way, after entering the data charging stage, the data line may start to be loaded with the positive data voltage V11 after the first interval duration GOE1 to switch the previous data voltage to the current data voltage V11. The data line may start to be loaded with the negative data voltage V12 after the second interval duration GOE2 to switch the previous data voltage to the current data voltage V12. In this way, the time point for the negative sub-pixel to be charged with the maximum value of the target data voltage V12 may be further later than the time point for the positive sub-pixel to be charged with the maximum value of the target data voltage V11, which may be equivalent to reducing the charging rate of the negative sub-pixels and increasing the charging rate of the positive sub-pixel, so as to reduce the charging rate difference between the positive sub-pixel and the negative sub-pixel as much as possible, and the problem of poor display of the display panel is improved.

In some embodiments of the present disclosure, the determining the first interval duration and the second interval duration may include: two set interval durations are selected from a plurality of pre-stored different set interval durations, a larger one of the two selected set interval durations is taken as the second interval duration, and a smaller one of the two selected set interval durations is taken as the first interval duration. Exemplarily, two set interval durations Y_2 and Y_3 may be selected from set interval durations Y_1, Y_2, Y_3 and Y_4, the set interval duration Y_2 is taken as the first interval duration, and the set interval duration Y_3 is taken as the second interval duration.

In some embodiments of the present disclosure, the data voltage may be triggered by a set edge of a data trigger signal and input to the data line. In addition, the set edge is one of a rising edge and a falling edge, and the start time point of the voltage conversion edge of the data voltage is aligned with the corresponding set edge. Exemplarily, as shown in FIG. 10, the set edge may be set as the falling edge, the positive data voltage may be triggered by the falling edge of a data trigger signal TP11 and input to the data line, and the negative data voltage may be triggered by the falling edge of a data trigger signal TP12 and input to the data line. Pulses of the data trigger signal TP11 correspond to pulses of the data trigger signal TP12 one to one, and the rising edge of each pulse of the data trigger signal TP11 is aligned with the rising edge of the corresponding pulse in the data trigger signal TP12, so that the falling edge of each pulse of the data trigger signal TP12 is behind the falling edge of the corresponding pulse in the data trigger signal TP11. In addition, an interval duration between the falling edge of each pulse of the data trigger signal TP12 and the falling edge of the corresponding pulse in the data trigger signal TP11 is (GOE2−GOE1). Alternatively, the set edge may also be set as the rising edge, which is not limited here.

Exemplarily, as shown in FIG. 10, taking n=4 and m=4 as an example, the digital signal forms of the data voltages, which are provided with gray scale values, corresponding to sub-pixels of the to-be-displayed image one to one may be acquired in the current display frame. In this way, the gray scale value corresponding to each sub-pixel may be determined according to the display data. The set voltage conversion rates K_2 and K_3 may be selected from the set voltage conversion rates K_1, K_2, K_3 and K_4, the set voltage conversion rate K_3 is taken as the first conversion rate, and the set voltage conversion rate K_2 is taken as the second conversion rate. Two set interval durations Y_2 and Y_3 are selected from the set interval durations Y_1, Y_2, Y_3 and Y_4, the set interval duration Y_2 is taken as the first interval duration, and the set interval duration Y_3 is taken as the second interval duration. In this way, the second interval duration GOE2 may be larger than the first interval duration GOE1, and the second conversion rate corresponding to the voltage conversion edge SB2 is less than the first conversion rate corresponding to the voltage conversion edge SB1. In this way, after entering the data charging stage, the data line may start to be loaded with the positive data voltage V11 after the first interval duration GOE1 (such as the set interval duration Y_2), and the first conversion rate (such as the set voltage conversion rate K_3) is adopted to switch the previous data voltage to the current data voltage V11. In addition, after entering the data charging stage, the data line may start to be loaded with the negative data voltage V12 after the second interval duration GOE2 (such as the set interval duration Y_3), and the second conversion rate (such as the set voltage conversion rate K_2) is adopted to switch the previous data voltage to the current data voltage V12. In this way, compared with making the voltage on the data line jump to a target value of the data voltage V12, the voltage on the data line may further jump to a target value of the data voltage V11 in advance, such that a time point for the negative sub-pixel to be charged with a maximum value of the target data voltage is later than a time point for the positive sub-pixel to be charged with a maximum value of the target data voltage, which may be equivalent to reducing the charging rate of the negative sub-pixel and increasing the charging rate of the positive sub-pixel, so as to reduce the charging rate difference between the positive sub-pixel and the negative sub-pixel as much as possible, and the problem of poor display of the display panel is improved.

An embodiment of the present disclosure provides a driving method for some yet other display panels, and transformation is performed for the implementations in the above embodiments. Only the difference between the present embodiment and the above embodiments is explained below, and similarities are omitted here.

Figure 11:
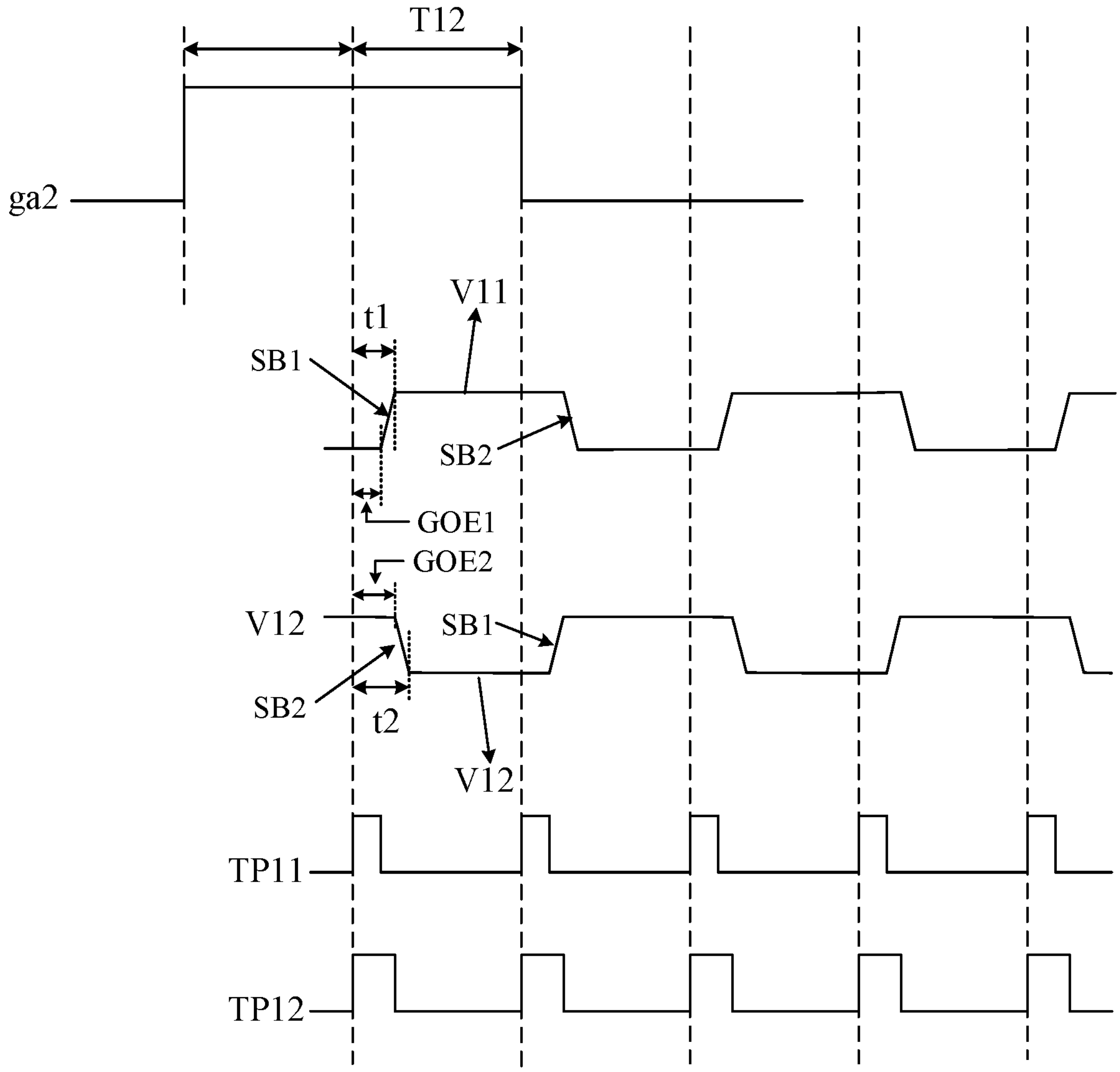
FIG. 11 is a diagram of some yet other signal timings in an embodiment of the present disclosure.

In some embodiments of the present disclosure, exemplarily, as shown in FIG. 11, the determined second interval duration GOE2 may be larger than the first interval duration GOE1. In this way, after entering the data charging stage, the data line may start to be loaded with the positive data voltage V11 after the first interval duration GOE1 to switch the previous data voltage to the current data voltage V11. The data line may start to be loaded with the negative data voltage V12 after the second interval duration GOE2 to switch the previous data voltage to the current data voltage V12. In this way, the time point for the negative sub-pixel to be charged with the maximum value of the target data voltage V12 may be further later than the time point for the positive sub-pixel to be charged with the maximum value of the target data voltage V11, which may be equivalent to reducing the charging rate of the negative sub-pixel and increasing the charging rate of the positive sub-pixel, so as to reduce the charging rate difference between the positive sub-pixel and the negative sub-pixel as much as possible, and the problem of poor display of the display panel is improved.

In some embodiments of the present disclosure, the determining the first interval duration and the second interval duration may include: two set interval durations are selected from a plurality of pre-stored different set interval durations, a larger one of the two selected set interval durations is taken as the second interval duration, and a smaller one of the two selected set interval durations is taken as the first interval duration. Exemplarily, two set interval durations Y_2 and Y_3 may be selected from set interval durations Y_1, Y_2, Y_3 and Y_4, the set interval duration Y_2 is taken as the first interval duration, and the set interval duration Y_3 is taken as the second interval duration.

In some embodiments of the present disclosure, the determined second conversion rate may be equal to the determined first conversion rate. Exemplarily, as shown in FIG. 11, a time duration for the negative data voltage V12 to be loaded on the data line and charged to a target value may be equal to a time duration for the positive data voltage V11 to be loaded on the data line and charged to the target value.

In some embodiments of the present disclosure, the determining the first conversion rate and the second conversion rate may include: one set voltage conversion rate is selected from a plurality of pre-stored different set voltage conversion rates as the first conversion rate and the second conversion rate. Exemplarily, taking n=4 as an example, the set voltage conversion rate K_2 may be selected from the set voltage conversion rates K_1, K_2, K_3 and K_4, and the set voltage conversion rate K_2 is taken as the first conversion rate and the second conversion rate.

In some embodiments of the present disclosure, the data voltage may be triggered by a set edge of a data trigger signal and input to the data line. In addition, the set edge is one of a rising edge and a falling edge, and the start time point of the voltage conversion edge of the data voltage is aligned with the corresponding set edge. Exemplarily, as shown in FIG. 11, the set edge may be set as the falling edge, the positive data voltage may be triggered by the falling edge of a data trigger signal TP11 and input to the data line, and the negative data voltage may be triggered by the falling edge of a data trigger signal TP12 and input to the data line. Pulses of the data trigger signal TP11 correspond to pulses of the data trigger signal TP12 one to one, and the rising edge of each pulse of the data trigger signal TP11 is aligned with the rising edge of the corresponding pulse in the data trigger signal TP12, so that the falling edge of each pulse of the data trigger signal TP12 is behind the falling edge of the corresponding pulse in the data trigger signal TP11. In addition, an interval duration between the falling edge of each pulse of the data trigger signal TP12 and the falling edge of the corresponding pulse in the data trigger signal TP11 is (GOE2−GOE1). Alternatively, the set edge may also be set as the rising edge, which is not limited here.

Exemplarily, as shown in FIG. 11, taking n=4 and m=4 as an example, the digital signal forms of the data voltages, which are provided with gray scale values, corresponding to sub-pixels of the to-be-displayed image one to one may be acquired in the current display frame. In this way, the gray scale value corresponding to each sub-pixel may be determined according to the display data. The set voltage conversion rate K_2 may be selected from the set voltage conversion rates K_1, K_2, K_3 and K_4, and the set voltage conversion rate K_2 is taken as the first conversion rate and the second conversion rate. Two set interval durations Y_2 and Y_3 are selected from the set interval durations Y_1, Y_2, Y_3 and Y_4, the set interval duration Y_2 is taken as the first interval duration, and the set interval duration Y_3 is taken as the second interval duration. In this way, the second interval duration GOE2 may be larger than the first interval duration GOE1, and the second conversion rate corresponding to the voltage conversion edge SB2 is equal to the first conversion rate corresponding to the voltage conversion edge SB1. In this way: after entering the data charging stage, the data line may start to be loaded with the positive data voltage V11 after the first interval duration GOE1 (such as the set interval duration Y_2), and the first conversion rate (such as the set voltage conversion rate K_2) is adopted to switch the previous data voltage to the current data voltage V11. In addition, after entering the data charging stage, the data line may start to be loaded with the negative data voltage V12 after the second interval duration GOE2 (such as the set interval duration Y_3), and the second conversion rate (such as the set voltage conversion rate K_2) is adopted to switch the previous data voltage to the current data voltage V12. In this way, compared with making the voltage on the data line jump to a target value of the data voltage V12, the voltage on the data line may jump to a target value of the data voltage V11 in advance, such that a time point for the negative sub-pixel to be charged with a maximum value of the target data voltage is later than a time point for the positive sub-pixel to be charged with a maximum value of the target data voltage, which may be equivalent to reducing the charging rate of the negative sub-pixel and increasing the charging rate of the positive sub-pixel, so as to reduce the charging rate difference between the positive sub-pixel and the negative sub-pixel as much as possible, and the problem of poor display of the display panel is improved.

Those skilled in the art will appreciate that the embodiments of the present disclosure may be provided as methods, systems, or computer program products. Therefore, the present disclosure may take the form of a full hardware embodiment, a full software embodiment, or an embodiment combining software and hardware. Besides, the present disclosure may adopt the form of a computer program product implemented on one or more computer available storage media (including but not limited to a disk memory, a CD-ROM, an optical memory and the like) containing computer available program codes.

The present disclosure is described with reference to the flow charts and/or block diagrams of the method, device (system), and computer program product according to the embodiments of the present disclosure. It should be understood that each flow and/or block in the flow chart and/or block diagram and the combination of flows and/or blocks in the flow chart and/or block diagram can be implemented by computer program instructions. These computer program instructions can be provided to processors of a general-purpose computer, a special-purpose computer, an embedded processor or other programmable data processing devices to generate a machine, so that instructions executed by processors of a computer or other programmable data processing devices generate an apparatus for implementing the functions specified in one or more flows of the flow chart and/or one or more blocks of the block diagram.

These computer program instructions can also be stored in a computer-readable memory capable of guiding a computer or other programmable data processing devices to work in a specific manner, so that instructions stored in the computer-readable memory generate a manufacturing product including an instruction apparatus, and the instruction apparatus implements the functions specified in one or more flows of the flow chart and/or one or more blocks of the block diagram.

These computer program instructions can also be loaded on a computer or other programmable data processing devices, so that a series of operation steps are executed on the computer or other programmable devices to produce computer-implemented processing, and thus, the instructions executed on the computer or other programmable devices provide steps for implementing the functions specified in one or more flows of the flow chart and/or one or more blocks of the block diagram.

Although the preferred embodiments of the present disclosure have been described, those skilled in the art can make additional changes and modifications on these embodiments once they know the basic creative concept. So the appended claims are intended to be construed to include the preferred embodiments and all changes and modifications that fall into the scope of the present disclosure.

Apparently, those skilled in the art may make various modifications and variations to the embodiments of the present disclosure without departing from the spirit and scope of the embodiments of the present disclosure. In this way, under the condition that these modifications and variations to the embodiments of the present disclosure fall within the scope of the claims of the present disclosure and their equivalent technologies, the present disclosure is also intended to include these modifications and variations.

What is claimed is:

1. A driving method for a display panel, comprising:

acquiring display data of a to-be-displayed image in a current display frame; and loading a data voltage on a data line in the display panel according to the display data, such that each sub-pixel in the display panel is charged with the data voltage; wherein a first target duration is between an end time point of a voltage conversion edge when the data line is loaded with a positive data voltage and a start time point of a data charging stage corresponding to the sub-pixel charged with the positive data voltage, a second target duration is between an end time point of a voltage conversion edge when the data line is loaded with a negative data voltage and a start time point of a data charging stage corresponding to the sub-pixel charged with the negative data voltage, and the second target duration is larger than the first target duration;

a voltage conversion rate of the voltage conversion edge when the data line is loaded with the positive data voltage is a first conversion rate;

a voltage conversion rate of the voltage conversion edge when the data line is loaded with the negative data voltage is a second conversion rate;

a start time point of the voltage conversion edge when the data line is loaded with the positive data voltage is later than the start time point of the data charging stage corresponding to the sub-pixel charged with the positive data voltage, and a first interval duration is between the start time point of the voltage conversion edge when the data line is loaded with the positive data voltage and the start time point of the data charging stage corresponding to the sub-pixel charged with the positive data voltage;

a start time point of the voltage conversion edge when the data line is loaded with the negative data voltage is later than the start time point of the data charging stage corresponding to the sub-pixel charged with the negative data voltage, and a second interval duration is between the start time point of the voltage conversion edge when the data line is loaded with the negative data voltage and the start time point of the data charging stage corresponding to the sub-pixel charged with the negative data voltage; wherein after the acquiring the display data of the to-be-displayed image in the current display frame, and before the loading the data voltage on the data line in the display panel according to the display data, the driving method further comprises:

determining the first conversion rate and the second conversion rate, and/or the first interval duration and the second interval duration; and the loading the data voltage on the data line in the display panel according to the display data, comprises:

loading the data voltage on the data line in the display panel by using the determined first conversion rate and second conversion rate, and/or the determined first interval duration and second interval duration according to the display data.

2. The driving method for the display panel according to claim 1, wherein the determined second conversion rate is less than the determined first conversion rate.

3. The driving method for the display panel according to claim 2, wherein the determining the first conversion rate and the second conversion rate, comprises:

selecting two set voltage conversion rates from a plurality of different set voltage conversion rates which are pre-stored, taking a larger one of the two selected set voltage conversion rates as the first conversion rate, and taking a smaller one of the two selected set voltage conversion rates as the second conversion rate.

4. The driving method for the display panel according to claim 3, wherein the determined second interval duration is larger than the determined first interval duration.

5. The driving method for the display panel according to claim 3, wherein the data voltage is triggered by a set edge of a data trigger signal and is input to the data line; the set edge is one of a rising edge and a falling edge; and the start time point of the voltage conversion edge of the data voltage is aligned with the set edge.

6. The driving method for the display panel according to claim 2, wherein the determined second interval duration is larger than the determined first interval duration.

7. The driving method for the display panel according to claim 2, wherein the data voltage is triggered by a set edge of a data trigger signal and is input to the data line; the set edge is one of a rising edge and a falling edge; and the start time point of the voltage conversion edge of the data voltage is aligned with the set edge.

8. The driving method for the display panel according to claim 1, wherein the determined second interval duration is larger than the determined first interval duration.

9. The driving method for the display panel according to claim 8, wherein the determining the first interval duration and the second interval duration, comprises:

selecting two set interval durations from a plurality of different set interval durations which are pre-stored, taking a larger one of the two selected set interval durations as the second interval duration, and taking a smaller one of the two selected set interval durations as the first interval duration.

10. The driving method for the display panel according to claim 1, wherein the determined second conversion rate is less than the determined first conversion rate, and the determined second interval duration is equal to the determined first interval duration.

11. The driving method for the display panel according to claim 10, wherein the determining the first conversion rate, the second conversion rate, the first interval duration and the second interval duration, comprises:

selecting two set voltage conversion rates from a plurality of different set voltage conversion rates which are pre-stored, taking a larger one of the two selected set voltage conversion rates as the first conversion rate, and taking a smaller one of the two selected set voltage conversion rates as the second conversion rate; and selecting one set interval duration from a plurality of different set interval durations which are pre-stored as the first interval duration and the second interval duration.

12. The driving method for the display panel according to claim 1, wherein the determined second conversion rate is equal to the determined first conversion rate, and the determined second interval duration is larger than the determined first interval duration.

13. The driving method for the display panel according to claim 12, wherein the determining the first conversion rate, the second conversion rate, the first interval duration and the second interval duration, comprises:

selecting one set voltage conversion rate from a plurality of different set voltage conversion rates which are pre-stored as the first conversion rate and the second conversion rate; and selecting two set interval durations from a plurality of different set interval durations which are pre-stored, taking a larger one of the two selected set interval durations as the second interval duration, and taking a smaller one of the two selected set interval durations as the first interval duration.

14. The driving method for the display panel according to claim 1, wherein the data voltage is triggered by a set edge of a data trigger signal and is input to the data line; the set edge is one of a rising edge and a falling edge; and the start time point of the voltage conversion edge of the data voltage is aligned with the set edge.

15. The driving method for the display panel according to claim 1, wherein the data voltage is triggered by a set edge of a data trigger signal and is input to the data line; the set edge is one of a rising edge and a falling edge; and the start time point of the voltage conversion edge of the data voltage is aligned with the set edge.

16. A display apparatus, comprising:

a display panel, comprising a source driving circuit; and a timing controller, configured to acquire display data of a to-be-displayed image in a current display frame, and send the display data to the source driving circuit; wherein the source driving circuit is configured to load a data voltage on a data line in the display panel according to the display data, such that each sub-pixel in the display panel is charged with the data voltage; wherein a first target duration is between an end time point of a voltage conversion edge when the data line is loaded with a positive data voltage and a start time point of a data charging stage corresponding to the sub-pixel charged with the positive data voltage, a second target duration is between an end time point of a voltage conversion edge when the data line is loaded with a negative data voltage and a start time point of a data charging stage corresponding to the sub-pixel charged with the negative data voltage, and the second target duration is larger than the first target duration;

the timing controller is further configured to determine a first conversion rate, a second conversion rate, a first interval duration and a second interval duration, and output a first rate control signal corresponding to the first conversion rate, a second rate control signal corresponding to the second conversion rate, a first duration control signal corresponding to the first interval duration and a second duration control signal corresponding to the second interval duration to the source driving circuit; and the source driving circuit is further configured to load the data voltage on the data line in the display panel according to the first rate control signal, the second rate control signal, the first duration control signal, the second duration control signal and the display data, such that each sub-pixel in the display panel is charged with the data voltage.

17. The display apparatus according to claim 16, wherein the source driving circuit comprises: a plurality of voltage output circuits, and one data line is electrically connected with one voltage output circuit; and each of the plurality of voltage output circuits is configured to load the data voltage on the data line electrically connected to the voltage output circuit according to the first rate control signal, the second rate control signal, the first duration control signal and the second duration control signal and based on the display data.

18. The display apparatus according to claim 17, wherein each voltage output circuit comprises a digital-to-analogue conversion circuit, a data output circuit, a first decoder and a second decoder;

the digital-to-analogue conversion circuit is configured to receive the display data and output display data obtained by performing digital-to-analogue conversion on the received display data to the data output circuit;

the first decoder is configured to obtain a first rate conversion signal through decoding according to the first rate control signal;

the second decoder is configured to obtain a second rate conversion signal through decoding according to the second rate control signal; and the data output circuit is configured to receive the first rate conversion signal, the first duration control signal, the second rate conversion signal and the second duration control signal, output the positive data voltage to the data line electrically connected to the data output circuit according to the first rate conversion signal and the first duration control signal and based on the display data output by the digital-to-analogue conversion circuit, and output the negative data voltage to the data line electrically connected to the data output circuit according to the second rate conversion signal and the second duration control signal and based on the display data output by the digital-to-analogue conversion circuit.

* * * * *